(12) United States Patent
Parker et al.

(10) Patent No.: US 9,945,286 B2
(45) Date of Patent: Apr. 17, 2018

(54) VARIABLE GEOMETRY TURBINE

(71) Applicant: Cummins Ltd, Huddersfield (GB)

(72) Inventors: John Frederick Parker, Huddersfield (GB); Simon David Moore, Holmfirth (GB); Ali Sophian, West Yorkshire (GB)

(73) Assignee: Cummins Ltd., Huddersfield (GB)

( * ) Notice: Subject to any disclaimer, the term of this patent is extended or adjusted under 35 U.S.C. 154(b) by 266 days.

(21) Appl. No.: 14/416,486

(22) PCT Filed: Apr. 10, 2014

(86) PCT No.: PCT/GB2014/051121
§ 371 (c)(1),
(2) Date: Jan. 22, 2015

(87) PCT Pub. No.: WO2014/167336
PCT Pub. Date: Oct. 16, 2014

(65) Prior Publication Data
US 2015/0361875 A1    Dec. 17, 2015

(30) Foreign Application Priority Data

Apr. 10, 2013 (GB) .................................. 1306521.4
Apr. 10, 2013 (GB) .................................. 1306522.2
Apr. 10, 2013 (GB) .................................. 1306523.0

(51) Int. Cl.
*F01D 17/16* (2006.01)
*F02B 37/22* (2006.01)
*F01D 17/14* (2006.01)

(52) U.S. Cl.
CPC ............. *F02B 37/22* (2013.01); *F01D 17/143* (2013.01); *F01D 17/165* (2013.01); *F05D 2220/40* (2013.01); *F05D 2250/90* (2013.01)

(58) Field of Classification Search
CPC ...... F01D 17/141; F01D 17/143; F01D 17/165; F02B 37/22
See application file for complete search history.

(56) References Cited

U.S. PATENT DOCUMENTS

| | | | |
|---|---|---|---|
| 2008/0089782 A1* | 4/2008 | Parker | F01D 17/143 415/150 |
| 2010/0021287 A1* | 1/2010 | Bouvier | F01D 17/143 415/151 |
| 2011/0100000 A1* | 5/2011 | Garrett | F01D 9/026 60/602 |

FOREIGN PATENT DOCUMENTS

| | | | |
|---|---|---|---|
| EP | 2148043 | 1/2010 | |
| EP | 2431575 A2 * | 3/2012 | ............. F01D 17/14 |
| WO | 2011015908 | 2/2011 | |

OTHER PUBLICATIONS

International Preliminary Report on Patentability dated Oct. 13, 2015 in International Application No. PCT/GB2014/051121.

* cited by examiner

*Primary Examiner* — Justin Seabe
(74) *Attorney, Agent, or Firm* — Faegre Baker Daniels LLP

(57) ABSTRACT

A variable geometry turbine has annular inlet passageway defined between a first surface of a radial wall of a movable wall mounted within a cavity and a facing wall of the turbine housing. The radial wall defines a second surface that opposes the first surface. The moveable wall member comprises an annular flange that extends axially into the cavity and supports a radial flange defining opposing third and fourth surfaces. The radial flange seals against an annular sleeve in the cavity to define a first area within the cavity which includes the radial second and third surfaces and a second area within the cavity which includes the radial fourth surface. The first and second areas are in fluid (Continued)

communication with regions of the annular inlet passageway which are respectively upstream and downstream of a radial vane passage.

19 Claims, 16 Drawing Sheets

VARIABLE GEOMETRY TURBINE

CROSS-REFERENCE TO RELATED APPLICATION

The present application is a National Stage of International Application No. PCT/GB2014/051121, filed Apr. 10, 2014, which claims priority to GB 1306522.2, filed Apr. 10, 2013 GB 1306521.4, filed Apr. 10, 2013 and GB 1306523.0, filed Apr. 10, 2013, the entire disclosures of which are hereby expressly incorporated herein by reference.

The present invention relates to a variable geometry turbine.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housing.

The turbine stage of a conventional turbocharger comprises: a turbine housing defining a turbine chamber within which the turbine wheel is mounted; an annular inlet passageway defined in the housing between facing radially extending walls arranged around the turbine chamber; an inlet arranged around the inlet passageway; and an outlet passageway extending from the turbine chamber. The passageways and chamber communicate such that pressurised exhaust gas admitted to the inlet flows through the inlet passageway to the outlet passageway via the turbine chamber and rotates the turbine wheel. It is known to improve turbine performance by providing vanes, referred to as nozzle vanes, in the inlet passageway so as to deflect gas flowing through the inlet passageway towards the direction of rotation of the turbine wheel.

Turbines of this kind may be of a fixed or variable geometry type. Variable geometry turbines differ from fixed geometry turbines in that the size of the inlet passageway can be varied to optimise gas flow velocities over a range of mass flow rates so that the power output of the turbine can be varied in line with varying engine demands.

Nozzle vane arrangements in variable geometry turbochargers can take different forms. In one type, known as a sliding "nozzle ring", the vanes are fixed to an axially movable wall that slides across the inlet passageway. The axially movable wall moves towards a facing shroud plate in order to close down the inlet passageway and in so doing the vanes pass through apertures in the shroud plate. The position of the nozzle ring relative to the shroud is adjustable to control the width of the inlet passageway. For instance, as gas flowing through the turbine decreases the inlet passageway width may also be decreased to maintain gas velocity and optimise turbine output. In an alternative arrangement vanes extend from a fixed wall through slots provided in an axially movable shroud plate.

The movable wall, be it the nozzle ring or shroud plate, is usually supported on rods extending parallel to the axis of rotation of the turbine wheel and is moved by an actuator, which is operable to displace the rods in an axial direction. Various types of actuators may be used, for example, a pneumatic actuator or a motor and gear transmission which are generally mounted on the outside of the housing. The actuator may be coupled to the nozzle ring or shroud plate by a yoke fixed on a separately formed shaft that is received in journal bearings in the wall of the bearing housing. The yoke rotates with the shaft and defines two spaced apart arms which extend away from the shaft on opposite sides of the turbine axis to engage portions of the support rods. The yoke may be operatively connected to the support rods using any suitable means of connection. In one non-limiting example, the end of each arm of the yoke has a pin that extends into a sliding block that is in turn received in a slot defined in a respective support rod. In this particular example, operation of the actuator causes the yoke and shaft to pivot about the shaft axis such that the pins on the arms describe an arc of a circle and that in turn causes the blocks to move axially and slide vertically within the slots defined in the support rods. Axial movement of the nozzle ring or shroud plate can thus be achieved by rotation of the yoke about the shaft. An object of certain aspects of the present invention is to provide alternative or improved means of mounting support rods to a nozzle ring or shroud plate of a variable geometry turbine. A further object of certain aspects of the present invention is to provide an alternative or improved means of connecting a component to a turbine housing.

During normal engine operation, gas flowing through the inlet passageway applies pressure to the radial face of the moveable wall tending to force the moveable wall, e.g. the nozzle ring, away from the facing wall of the inlet passageway, e.g. the shroud plate, thereby opening the inlet passageway. At certain times during operation of the engine it is desirable to move the moveable wall closer to the facing wall of the inlet passageway so as to reduce the axial width of the inlet passageway and increase the speed of the air flow. During a thermal management cycle (also referred to as thermal regeneration) the engine is usually at idle and the movable wall is positioned so as to be very close to the facing wall, thereby defining a turbine inlet passageway which is typically much narrower than during normal engine operation. Due to this constriction, the speed of gas passing through the inlet passageway increases significantly and consequently has a very low pressure. As a result, there is a large difference in pressure between the pre-turbine pressure of gas upstream of the nozzle vanes extending across the inlet passageway and the pressure of gas downstream of the nozzle vanes before it impinges upon the turbine.

EP 0 654 587 discloses a variable geometry turbine with pressure balance apertures in a moveable nozzle ring so as to admit gas at the relatively high pre-turbine pressure upstream of the nozzle vanes into a cavity behind the nozzle ring. In this way, the cavity behind the nozzle ring is at a pressure substantially equal to, but always slightly less than, the pressure acting on the front face of the nozzle ring to ensure a small but unidirectional force is applied to the nozzle ring by gas flowing through the turbine inlet. It has been found, however, that even with the provision of pressure balance holes as disclosed in EP 0 654 587, the force on the nozzle ring can fluctuate undesirably as the pressure within the turbine inlet fluctuates due to exhaust pulses being released into the exhaust manifold of the vehicle engine by the opening and closing action of the exhaust valves. In order to address this problem, EP 1 888 881 describes the development of a movable nozzle ring defining two circumferential arrays of pressure balance apertures; a first array within the vane passage and a second array upstream or downstream of the first array. While this arrangement alleviated some of the issues observed in the original pressure balance hole design, in particular it enables a low mean force on the nozzle ring to be present over a range of engine speeds, more recently it has been found that because the pressure transmitted into the cavity behind the nozzle ring is dependent upon the axial position of the nozzle ring the multiple arrays of pressure balance apertures must be very carefully positioned and sized. There is also a delay in the transfer of pressure through the pressure balance holes so that there is a time lag in the transfer of pressure pulses caused by different engine cylinders which results in quite a large pressure fluctuation or vibration across the nozzle ring.

An object of the present invention is to obviate or mitigate one or more of the aforementioned problems associated with variable geometry turbines which employ a moveable wall.

According to a first aspect of the present invention there is provided a variable geometry turbine comprising:

a turbine wheel mounted within a housing for rotation about a turbine axis; and an annular inlet passageway extending radially inwards towards the turbine wheel;

the annular inlet passageway being defined between a first surface of a radially extending wall of a movable wall member mounted within a cavity provided within the housing and a facing wall of the housing;

the movable wall member being movable in an axial direction so as to vary the size of the annular inlet passageway;

an array of inlet guide vanes extending across said annular inlet passageway to define a radial vane passage;

the radially extending wall of the movable wall member defining a radial second surface that opposes the first surface;

the moveable wall member further comprising an annular flange that extends axially into the cavity and which supports a radially extending flange that defines opposing radial third and fourth surfaces;

the radially extending flange sealing against an annular sleeve provided in the cavity so as to define a first area within the cavity which includes the radial second and third surfaces and a second area within the cavity which includes the radial fourth surface;

the first area within the cavity being in fluid communication with a region of the annular inlet passageway upstream of the radial vane passage; and the second area within the cavity being in fluid communication with a region of the annular inlet passageway downstream of the radial vane passage.

With the arrangement according to the present invention the pressure behind the moveable wall member is maintained during use at the pre-turbine pressure upstream of the vane passage, which is relatively constant. Importantly, this pressure does not change as dramatically as pressure within the vane passage changes as the size of the inlet passageway is reduced. This is advantageous since it is much easier to predict and to "match" the pre-turbine pressure upstream of the vane passage than it is to select pressure balance holes which provide the necessary transmission of pressure from the inlet passageway to behind the moveable wall member. In addition, with the arrangement of the present invention pressure pulses from the engine arrive in the cavity behind the moveable wall at the same time as they arrive in the turbine inlet passageway and so there is no time lag, and therefore very little vibration, caused by these pulses. Accordingly, the only difference in pressure across the moveable wall member is that which is established by the radially extending "pressure balance" flange, there is no pressure variation which arises due to a time lag in transferring pressure across the moveable wall member. Consequently, it is easier to predict and, importantly maintain, a mean force on the moveable wall member in whichever axial direction is desired.

During use, the pressure behind the moveable wall member within the cavity is at the pre-turbine pressure upstream of the vane passage and is therefore higher than the pressure within the inlet passageway due to the reduction in the pressure of gas flowing through the vane passage. In the absence of the pressure balancing arrangement according to the present invention there would therefore be a tendency for the moveable wall to slam shut in the absence of a relatively powerful actuator. The radially extending "pressure balance" flange reduces this tendency by providing a radial surface within the cavity which opposes the radial second surface (i.e. the back face) of the radially extending wall of the moveable wall member, allowing use of a less powerful actuator, which may therefore be smaller, lighter and potentially cheaper.

Since the pressure of gas on either side of the portion of the radially extending wall of the moveable wall member outside the outer diameter of the vanes is approximately equal, the force tending to close the moveable wall member is generated by the reduced pressure in the vane passage as compared to the pressure of gas behind the radially extending wall at that diameter. Accordingly, in one preferred embodiment, the diameter of the "pressure balance" flange is not greater than the diameter of the vane passage. That is, it is preferred that the extent to which the "pressure balance" flange extends radially from the axially extending flange is not greater than the distance from the radially inner surface of the axially extending flange to the outer diameter of the vanes extending across the inlet passageway.

The moveable wall member and/or housing may be arranged to define a path for gas flowing towards the turbine to flow into the cavity behind the moveable wall member. In this way, such gas can flow around a radially outer edge of the moveable wall member to transmit the relatively high pre-turbine pressure to the back of the moveable wall member. Alternatively, the radially outer edge of the moveable wall member could be sealed with respect to the housing and one or more apertures defined by the moveable wall member to facilitate gas flow into the cavity. It will be appreciated that provided the one or more apertures are defined in the moveable wall member upstream of the vane passage, the aperture(s) would still transmit the relatively high pre-turbine pressure to the cavity.

Arranging the radially extending flange so that it seals against the annular sleeve provided in the cavity restricts the transmission of the relatively high pre-turbine pressure to the opposite radial surface of the flange, which would otherwise negate the pressure balancing function provided by the "pressure balance" flange.

In one embodiment, there is no other leakage path to admit the relatively high pre-turbine pressure to reach the opposite radial surface of the "pressure balance" flange. In an alternative preferred embodiment, a leakage path is defined to permit gas at the relatively high pre-turbine pressure within the first area to flow into the second area to increase the pressure of gas within the second area and thereby reduce the force required to close the moveable wall member, which might otherwise become too high if the pressure differential between the first and second areas was too great.

The leakage path may be defined in any suitable way. The sleeve may define one or more apertures to allow high pressure gas in the first area to flow to the second area. One or more of the apertures may be defined by the sleeve at a location such that they are only "active" when the moveable wall member is closed at very small inlet passageway widths, for example, when the axial width of the inlet passageway between the moveable wall member and the facing wall of the housing is less than around 20% of its width when fully open, i.e. when the moveable wall member is fully retracted into the cavity. One or more of the apertures may only be "active" when the moveable wall member is extended so that the axial width of the inlet passageway is around 10% of its width when fully open. In this way, the first and second areas are sealed from one another while the turbine is operating with the inlet passageway more than around 10 to 20% open. The two areas are then fluidly connected when the inlet passageway is closed down to less than around 10 to 20% open. Once the two areas are connected, the pressure balance force tending to push the moveable wall member into the cavity, i.e. to open the inlet passageway, reduces.

To reduce the possibility of this arrangement inducing a tendency for the moveable wall member to slam shut against the facing wall of the inlet passageway at low inlet passageway widths, the second area within the cavity is in fluid communication with the region of the annular inlet passageway downstream of the radial vane passage. It is preferred that a controlled leakage flow path is defined between the second area within the cavity and the region of the passageway downstream of the vane passage. The controlled leakage flow path is preferably defined between the annular flange and a wall of the cavity. A convenient means of defining the controlled leakage flow path is via a sealing arrangement between the axially extending flange of the moveable wall member and a wall of the cavity. This seal is preferably located radially inwardly of the seal between the "pressure balance" flange and the sleeve. The leakage flow path past the radially inner seal may be defined in any convenient manner. For example, the radial extent of the seal may be selected to define a predetermined radial clearance between the seal and the component against which it is sealing (the axially extending flange or cavity wall). Alternatively, or additionally, the seal may define grooves or cut-out sections of predetermined dimension in its outer surface facing the component against which it is sealing. By way of a further example, the radially inner surface of the axially extending flange may define one or more axially extending grooves which extend to both sides of the or each seal so as to establish small passages past the inner seal for gas to flow so that the relatively low pressure gas downstream of the vanes can be transmitted to the second area behind the "pressure balance" flange. One or more of the grooves may be skewed relative to the longitudinal axis of the turbine or may follow a helical or spiral path such that the or each seal wipes across a sharp end of the groove(s) during axial displacement of the moveable wall member, which may help to maintain a uniform, reliable seal. When multiple grooves are used, the axial spacing between adjacent grooves may be substantially equal across the full set of grooves or the axial spacing may vary from one pair of adjacent grooves to another pair of adjacent grooves. Non-equal axial spacing of pairs of grooves may improve one or more performance characteristics of the turbine, such as high cycle fatigue. One or more of the grooves may extend along part of the axial extent of the sleeve, or may extend along the full axial extent of the sleeve. In this way, it is possible to carefully control the pressure exerted behind the "pressure balance" flange at all axial positions of the moveable wall member.

In a preferred embodiment, the sleeve defines one or more apertures with a total cross-sectional area that is similar to or less than the total cross-sectional area of the leakage flow path defined past the seal between the axially extending flange of the moveable wall member and the wall of the cavity. The dimensions of the apertures in the sleeve which provides a leakage path past the seal between the "pressure balance" flange and the sleeve and the formations defining the leakage path past the seal between the axially extending flange and the cavity wall should be selected to ensure that gas can flow between the various interconnected areas sufficiently quickly to achieve the intended pressure balancing effects and potentially to reduce turbine efficiency to aid thermal regeneration. They should also be selected to ensure that they will not become blocked over a period of time, for example, by exhaust particles and the general build up of fuel by-products. Finally, they should also be selected to ensure that the pressure within the second area, i.e. the volume behind the "pressure balance" flange, is within a range that will produce a range of stability such that the balance of the forces tending to open and shut the moveable wall member remain generally consistent throughout use.

It will be appreciated that the combination of the seals and "pressure balance" flange establishes three interconnected regions of varying pressure depending upon the axial position of the moveable wall member: a relatively high pressure region behind the moveable wall member; a relatively low pressure region downstream of the vane passage; and an intermediate, but varying, pressure region in the volume behind the "pressure balance" flange which is sensitive to the axial location of the moveable wall member.

The moveable wall member may be a shroud defining apertures for receipt of the vanes, which are attached to a nozzle ring whose radial surface corresponds to the facing wall of the housing. Alternatively, the moveable wall member may be a nozzle ring which supports the vanes for receipt in apertures defined by a shroud plate whose radial surface corresponds to the facing wall of the housing. It will be appreciated that, regardless of which component defines the facing wall of the housing, the facing wall of the housing may itself be secured to the housing, or it may be moveable. That is, in the embodiment where the moveable wall member of the present invention is a shroud for example, the vanes are supported by a nozzle ring which may be secured to the housing or moveable. In the embodiment where the moveable wall member of the present invention is the nozzle ring supporting the vanes, the presence of the "pressure balance" flange on the moveable nozzle ring may obviate the need to provide pressure balancing apertures through the radial face of the nozzle ring. When the facing wall is secured to the housing, it is preferred that it is secured via a locking screw connection. In this case, complementary locking screw threads may be defined by an outer circumferential surface of an axially extending flange connected to the facing wall and a radially inward facing surface of the housing or a ring secured to the housing.

A radially inner section of the facing wall that is secured to the housing may have a surface with a profile that is selected based upon the shape of the turbine wheel so as to optimise the performance of the turbine wheel during some or all operating conditions. It is preferred that the surface of the radially inner section of the facing wall has profile that corresponds to a radially outer profile of the turbine wheel. Matching the profile of the radially inner section of the facing wall with the outer profile of the turbine wheel enables the clearance between the turbine wheel and the radially inner section of the facing wall to be minimised.

Minimising this clearance reduces losses in turbine efficiency which may occur due to gas leaking from the inlet passageway upstream of the turbine wheel to the outlet passageway of the turbine downstream of the turbine wheel without contributing to the rotation of the turbine wheel.

In a preferred embodiment of the first aspect of the present invention the movable wall member is annular and the turbine further comprises at least one guide member, one of the movable wall member and the at least one guide member defining an annular channel for receipt of a complementary formation defined by the other of the movable wall member and the at least one guide member to mount the annular movable wall member to said at least one guide member to effect axial movement of the movable wall member to vary the size of the annular inlet passageway.

The annular movable wall member may incorporate an axially extending mounting flange and a radially extending mounting flange that cooperate to define the annular channel.

The mid-point of the annular channel that is of an equal distance radially from the inner and outer diameters of the annular channel (herein referred to as the "mid-diameter") may be located at any desirable diameter relative to the vane passage. Moreover, the annular channel may extend over any desirable radial extent, i.e. may have any desirable radial 'depth' provided it can accommodate the formation defined by the or each guide rod. The mid-diameter of the annular channel may be provided radially outwards of the outer diameter of the vane passage, radially inwards of the inner diameter of the vane passage, it may be located at or adjacent to the inner or outer diameter of the vane passage.

The annular channel may be provided radially outwards of the outer diameter of the vane passage or it may be provided radially inwards of the inner diameter of the vane passage.

Alternatively, the annular channel may lie radially within the vane passage, i.e. the inner diameter of the annular channel being radially outboard of the inner diameter of the vane passage while the outer diameter of the annular channel is radially inboard of the outer diameter of the vane passage.

As a further alternative, the annular channel may overlap radially with the vane passage. In this case, the annular channel may extend radially inboard of the inner diameter of the vane passage and/or the annular channel may extend radially outboard of the outer diameter of the vane passage.

The axially extending mounting flange incorporated into the annular movable wall member may be a radially outer axially extending annular flange which is axially shorter than the annular flange that extends axially into the cavity and which supports the radially extending flange that defines the third and fourth surfaces. The radially extending mounting flange may extend radially inwards from an axially outboard end of the radially outer axially extending annular flange (i.e. the end of the flange spaced furthest from the vane passage) so as to define the annular channel for receipt of the formation on the at least one guide member. The formation may be defined by an axially inboard end of said at least one guide member (i.e. the end of the at least one guide member closest to the vane passage) and/or may be a circumferentially extending formation of complementary shape to that of the annular channel. The annular channel may extend along one or more portions of the circumference of the annular moveable wall member or around the full circumference of the annular moveable wall member. The inner diameter of the radially extending mounting flange may lie radially outboard of the outer diameter of the vane passage. When the at least one guide member is engaged within the annular channel, the innermost diameter of any part of the at least one guide member may lie radially outboard of the vane passage. Consequently, in embodiments where the annular moveable wall member is a shroud plate defining vane slots to receive the vanes during movement of the shroud, sliding receipt of the vanes through the vane slots is not hindered by the at least one guide member when mounted to the annular moveable wall member. FIGS. 13A to 14D depict a specific embodiment of a shroud/actuator rod arrangement in accordance with this embodiment of the first aspect of the present invention. Alternatively, when it is desired to employ one or more guide members located radially inboard of the outer diameter of the vane passage a terminal section of the or each guide member may be provided with an axially extending cut-out section to accommodate sliding receipt of the vanes in the vane slots. Specific embodiments of this type of arrangement are shown in FIGS. 19 and 20 below, it being noted that the FIG. 20 embodiment does not include an axially shorter radially outer flange but instead incorporates a radially outer flange of similar length to the radially inner flange.

The axially extending mounting flange incorporated into the movable wall member may be a radially outer axially extending annular flange which is a similar axial length to the annular flange that extends axially into the cavity and which supports the radially extending flange that defines the third and fourth surfaces.

In a first version of this arrangement, the radially extending mounting flange extends radially inwards from a position on the axially extending mounting flange which is in between the radially extending wall of the movable wall member and an axially outboard end of the axially extending mounting flange so that the annular channel for receipt of the formation on the at least one guide member is located between the radially extending wall of the movable wall member and the radially extending mounting flange which are connected by a section of the radially outer axially extending flange. It may be desirable to provide the at least one guide member with a cut-out section defining an axially extending clearance which radially overlaps the vane passage to accommodate sliding receipt of the vanes through vane slots defined by a shroud where the annular movable wall member is such a shroud. A specific embodiment of this type of arrangement is shown in FIG. 20.

In a second version of this arrangement, the radially extending mounting flange extends from an axially outboard end of the axially extending mounting flange and there is provided a further radially extending mounting flange which extends from a position on the axially extending mounting flange which is intermediate the radially extending mounting flange at the axially outboard end of the axially extending mounting flange and the radially extending wall of the movable wall member so that the annular channel is located between the two radially extending mounting flanges and a section of the axially extending mounting flange which connects them. In this version it is desirable to provide the further radially extending mounting flange a sufficient distance axially outboard of the radially extending wall of the annular wall member to provide enough space between the radially extending wall of the annular wall member and an axially inboard end of the guide member to accommodate sliding receipt of the vanes through vanes slot defined by a shroud when the annular movable wall member is such a shroud. A specific embodiment of this type of arrangement is shown in FIG. 21.

In a further embodiment, the axially extending mounting flange extends axially from the movable wall member at a diameter that is radially inboard of the outer diameter of the movable wall member and the radially extending mounting flange extends radially outwards at the axially outboard end of the axially extending mounting flange. Again, the annular channel may extend along the full circumferential length of the annular movable wall member or just along one or more sections thereof. The axially extending mounting flange may lie radially outboard of the outer diameter of the vane passage; this arrangement being particularly preferred when the annular movable wall member is a shroud defining vane slots for sliding receipt of the vanes since it ensures that the at least one guide member does not hinder movement of the vanes through the vane slots in the shroud. FIGS. 15A to 16C depict a specific embodiment of a shroud/actuator rod arrangement in accordance with this embodiment of the fourth aspect of the present invention.

In a further preferred embodiment for connecting the at least one guide member to the movable wall member the axially extending mounting flange incorporated into the movable wall member is connected to a radially inner axially extending annular flange which is axially longer than a radially outer axially extending flange also incorporated into the annular moveable wall member. The radially extending mounting flange may extend radially inwards from an axially outboard end of the radially inner axially extending annular flange so as to define the annular channel for receipt of the formation on the at least one guide member.

In a preferred arrangement the axially extending mounting flange extends from a radially outer end of the pressure balance flange, i.e. the radially extending flange that defines the radial third and fourth surfaces. The radially extending mounting flange may extend radially inwards; alternatively, the reverse arrangement may be used. That is, the axially extending mounting flange may extend axially from a radially inner end of the pressure balance flange and the radially extending mounting flange may extend radially outwards so that the annular channel is configured for receipt of a radially inwardly extending formation as opposed to the radially outwardly extending formation that would be used with the former arrangement. It will be appreciated that in this embodiment, where the annular channel is defined by components associated with the radially inner axially extending annular flange rather than the radially outer axially extending flange, there is a risk that the arrangement of flanges and/or guide member(s) may hinder receipt of the vanes in vanes slots defined by a shroud where the annular movable wall member is such a shroud. In this instance, it is preferred that the axially and radially extending flanges mounting defining the annular channel are spaced axially by a sufficient distance to remove any such risk. That is, it is preferred that the axially and radially extending mounting flanges defining the annular channel are located an axial distance greater than the extent to which the vanes project axially from the axially outboard side of the shroud when the shroud is closest to the facing wall of the housing, i.e. when the annular inlet passageway is at its minimum size.

In an alternative preferred embodiment, the at least one guide member may define the annular channel, preferably in the form of a radially extending recess. The movable wall member may define a radially extending mounting flange for receipt in the annular channel defined by the at least one guide member to mount the movable wall member to the at least one guide member. The movable wall member may further incorporate an axially extending mounting flange which extends from the radial wall of the movable wall member to the radially extending mounting flange. The radially extending mounting flange of the movable wall member preferably has an axial thickness which is of a dimension so as to be receivable in the annular channel defined by the at least one guide member. Conveniently, the radially extending mounting flange is annular and may extend around the full circumference of the axially extending mounting flange or just one or more sections thereof. The radially extending recess of the at least one guide member may possess an arcuate cross-section when viewed along the turbine axis of complementary curvature to that of the region or regions of the annular radially extending mounting flange which is received in the recess. In this way, the annular movable wall member can be free to rotate about the turbine axis with respect to the at least one guide member at least during initial assembly of the components, or throughout use when assembled into the turbine. This means of connection is significantly less complicated than most conventional arrangements and also enables the at least one guide members to be mounted to the movable wall member at any desired angular position, and which can then be adjusted simply by rotating the components with respect to one another. Moreover, this allows the movable wall member/guide member sub-assembly to be mounted within the housing whilst still permitting rotation of the movable wall member to accommodate subsequent assembly of other turbine components. Furthermore, this mounting arrangement can accommodate differential thermal expansion between the guide member(s) and the movable wall member.

As mentioned above, in prior art turbines, the movable wall, which may be the nozzle ring or the shroud plate, is usually supported on rods extending parallel to the axis of rotation of the turbine wheel and is moved by an actuator, which is operable to displace the rods in an axial direction. It is desirable to provide alternative or improved means of mounting support rods to a nozzle ring or shroud plate of a variable geometry turbine.

According to a second aspect of the present invention there is provided a variable geometry turbine comprising:
  a turbine wheel mounted within a housing for rotation about a turbine axis; and
  an annular inlet passageway extending radially inwards towards the turbine wheel;
  the annular inlet passageway being defined between a first surface of a radially extending wall of an annular movable wall member mounted within a cavity provided within the housing and a facing wall of the housing;
  an array of inlet guide vanes extending across said annular inlet passageway to define a radial vane passage;
  the annular movable wall member being mounted to at least one guide member that is translatable in a direction substantially parallel to the turbine axis to move said annular movable wall member in an axial direction so as to vary the size of the annular inlet passageway;
  wherein one of the annular movable wall member and the at least one guide member defines an annular channel for receipt of a complementary formation defined by the other of the annular movable wall member and the at least one guide member to mount the annular movable wall member to said at least one guide member.

In a first preferred embodiment of the second aspect of the present invention the annular movable wall member incorporates an axially extending mounting flange and a radially extending mounting flange that cooperate to define the annular channel.

The mid-point of the annular channel that is of an equal distance radially from the inner and outer diameters of the annular channel (herein referred to as the "mid-diameter") may be located at any desirable diameter relative to the vane passage. Moreover, the annular channel may extend over any desirable radial extent, i.e. may have any desirable radial 'depth' provided it can accommodate the formation defined by the or each guide rod. The mid-diameter of the annular channel may be provided radially outwards of the outer diameter of the vane passage, radially inwards of the inner diameter of the vane passage, it may be located at or adjacent to the inner or outer diameter of the vane passage.

The annular channel may be provided radially outwards of the outer diameter of the vane passage or it may be provided radially inwards of the inner diameter of the vane passage.

Alternatively, the annular channel may lie radially within the vane passage, i.e. the inner diameter of the annular channel being radially outboard of the inner diameter of the vane passage while the outer diameter of the annular channel is radially inboard of the outer diameter of the vane passage.

As a further alternative, the annular channel may overlap radially with the vane passage. In this case, the annular channel may extend radially inboard of the inner diameter of the vane passage and/or the annular channel may extend radially outboard of the outer diameter of the vane passage.

The axially extending mounting flange incorporated into the annular movable wall member may be a radially outer axially extending annular flange which is axially shorter than a radially inner axially extending flange also incorporated into the annular moveable wall member. The radially extending mounting flange may extend radially inwards from an axially outboard end of the radially outer axially extending annular flange (i.e. the end of the flange spaced furthest from the vane passage) so as to define the annular channel for receipt of the formation on the at least one guide member. The formation may be defined by an axially inboard end of said at least one guide member (i.e. the end of the at least one guide member closest to the vane passage) and/or may be a circumferentially extending formation of complementary shape to that of the annular channel. The annular channel may extend along one or more portions of the circumference of the annular moveable wall member or around the full circumference of the annular moveable wall member. The inner diameter of the radially extending mounting flange may lie radially outboard of the outer diameter of the vane passage. When the at least one guide member is engaged within the annular channel, the innermost diameter of any part of the at least one guide member may lie radially outboard of the vane passage. Consequently, in embodiments where the annular moveable wall member is a shroud plate defining vane slots to receive the vanes during movement of the shroud, sliding receipt of the vanes through the vane slots is not hindered by the at least one guide member when mounted to the annular moveable wall member. FIGS. 13A to 14D depict a specific embodiment of a shroud/actuator rod arrangement in accordance with this embodiment of the second aspect of the present invention. Alternatively, when it is desired to employ one or more guide members located radially inboard of the outer diameter of the vane passage a terminal section of the or each guide member may be provided with an axially extending cut-out section to accommodate sliding receipt of the vanes in the vane slots. Specific embodiments of this type of arrangement are shown in FIGS. 19 and 20 below, it being noted that the FIG. 20 embodiment does not include an axially shorter radially outer flange but instead incorporates a radially outer flange of similar length to the radially inner flange.

The axially extending mounting flange incorporated into the annular movable wall member may be a radially outer axially extending annular flange which is a similar axial length to a radially inner axially extending flange also incorporated into the annular moveable wall member.

In a first version of this arrangement, the radially extending mounting flange extends radially inwards from a position on the radially outer flange which is in between the radially extending wall of the annular movable wall member and an axially outboard end of the radially outer axially extending annular flange so that the annular channel for receipt of the formation on the at least one guide member is located between the radially extending wall of the annular movable wall member and the radially extending mounting flange which are connected by a section of the radially outer axially extending flange. It may be desirable to provide the at least one guide member with a cut-out section defining an axially extending clearance which radially overlaps the vane passage to accommodate sliding receipt of the vanes through vane slots defined by a shroud where the annular movable wall member is such a shroud. A specific embodiment of this type of arrangement is shown in FIG. 20.

In a second version of this arrangement, the radially extending mounting flange extends from an axially outboard end of the radially outer flange and there is provided a further radially extending mounting flange which extends from a position on the radially outer flange which is intermediate the radially extending mounting flange at the axially outboard end of the radially outer axially extending flange and the radially extending wall of the annular movable wall member so that the annular channel is located between the two radially extending mounting flanges and a section of the radially outer axially extending flange which connects them. In this version it is desirable to provide the further radially extending mounting flange a sufficient distance axially outboard of the radially extending wall of the annular wall member to provide enough space between the radially extending wall of the annular wall member and an axially inboard end of the guide member to accommodate sliding receipt of the vanes through vanes slot defined by a shroud when the annular movable wall member is such a shroud. A specific embodiment of this type of arrangement is shown in FIG. 21.

In a further embodiment, the axially extending mounting flange extends axially from the annular movable wall member at a diameter that is radially inboard of the outer diameter of the annular movable wall member and the radially extending mounting flange extends radially outwards at the axially outboard end of the axially extending mounting flange so as to cooperate to define the annular channel. Again, the annular channel may extend along the full circumferential length of the annular movable wall member or just along one or more sections thereof. The axially extending mounting flange may lie radially outboard of the outer diameter of the vane passage; this arrangement being particularly preferred when the annular movable wall member is a shroud defining vane slots for sliding receipt of the vanes since it ensures that the at least one guide member does not hinder movement of the vanes through the vane slots in the shroud. FIGS. 15A to 16C depict a specific embodiment of a shroud/actuator rod arrangement in accordance with this embodiment of the second aspect of the present invention.

In a further preferred embodiment for connecting the at least one guide member to the annular movable wall member the axially extending mounting flange incorporated into the annular movable wall member is connected to a radially inner axially extending annular flange which is axially longer than a radially outer axially extending flange also incorporated into the annular moveable wall member. The radially extending mounting flange may extend radially inwards from an axially outboard end of the radially inner axially extending annular flange so as to define the annular channel for receipt of the formation on the at least one guide member. It will be appreciated that in this embodiment, where the annular channel is defined by components associated with the radially inner axially extending flange rather than the radially outer axially extending flange there is a risk that the arrangement of mounting flanges and/or guide member(s) may hinder receipt of the vanes in vanes slots defined by a shroud where the annular movable wall member is such a shroud. In this instance, it is preferred that the axially and radially extending mounting flanges defining the annular channel are spaced axially by a sufficient distance to remove any such risk. That is, it is preferred that the axially and radially extending mounting flanges defining the annular channel are located an axial distance that is greater than the extent to which the vanes project axially from the axially outboard side of the shroud when the shroud is closest to the facing wall of the housing, i.e. when the annular inlet passageway is at its minimum size.

In a second preferred embodiment of second aspect of the present invention the at least one guide member defines the annular channel, preferably in the form of a radially extending recess. The annular movable wall member may define a radially extending mounting flange for receipt in the annular channel defined by the at least one guide member to mount the annular movable wall member to the at least one guide member. The annular movable wall member may further incorporate an axially extending mounting flange which extends from the radial wall of the movable wall member to the radially extending mounting flange. The radially extending mounting flange of the annular movable wall member preferably has an axial thickness which is of a dimension so as to be receivable in the annular channel defined by the at least one guide member. Conveniently, the radially extending mounting flange is annular and may extend around the full circumference of the axially extending mounting flange or just one or more sections thereof. The radially extending recess of the at least one guide member may possess an arcuate cross-section when viewed along the turbine axis of complementary curvature to that of the region or regions of the annular radially extending mounting flange which is received in the recess. In this way, the annular movable wall member can be free to rotate about the turbine axis with respect to the at least one guide member at least during initial assembly of the components, or throughout use when assembled into the turbine. This means of connection is significantly less complicated than most conventional arrangements and also enables the at least one guide member to be mounted to the movable wall member at any desired angular position, and which can then be adjusted simply by rotating the components with respect to one another. Moreover, this allows the movable wall member/guide member sub-assembly to be mounted within the housing whilst still permitting rotation of the movable wall member to accommodate subsequent assembly of other turbine components. Furthermore, this mounting arrangement can accommodate differential thermal expansion between the guide member(s) and the movable wall member.

The moveable wall member may be a shroud defining apertures for receipt of the vanes, which are attached to a nozzle ring whose radial surface corresponds to the facing wall of the housing. Alternatively, the moveable wall member may be a nozzle ring which supports the vanes for receipt in apertures defined by a shroud plate whose radial surface corresponds to the facing wall of the housing. It will be appreciated that, regardless of which component defines the facing wall of the housing, the facing wall of the housing may itself be secured to the housing, or it may be moveable. That is, in the embodiment where the moveable wall member of the present invention is a shroud for example, the vanes are supported by a nozzle ring which may be secured to the housing or moveable. The facing wall may be secured to the housing via a locking screw connection. Moreover, complementary locking screw threads may be defined by an outer circumferential surface of an axially extending flange connected to the facing wall and a radially inward facing surface of the housing or a ring secured to the housing.

A radially inner section of the facing wall that is secured to the housing may have a surface with a profile that is selected based upon the shape of the turbine wheel so as to optimise the performance of the turbine wheel during some or all operating conditions. It is preferred that the surface of the radially inner section of the facing wall has profile that corresponds to a radially outer profile of the turbine wheel. Matching the profile of the radially inner section of the facing wall with the outer profile of the turbine wheel enables the clearance between the turbine wheel and the radially inner section of the facing wall to be minimised. Minimising this clearance reduces losses in turbine efficiency which may occur due to gas leaking from the inlet passageway upstream of the turbine wheel to the outlet passageway of the turbine downstream of the turbine wheel without contributing to the rotation of the turbine wheel.

As mentioned above, it is desirable to provide an alternative or improved means of connecting a component to a turbine housing.

According to a third aspect of the present invention there is provided a turbine comprising:
  a turbine wheel mounted within a housing for rotation about a turbine axis; and
  an annular inlet passageway extending radially inwards towards the turbine wheel;
  the annular inlet passageway being defined between first and second opposing walls of the housing;
  wherein said first wall of the housing is defined by a radial wall of an annular member which further defines an axially extending flange, said flange defining a screw thread which cooperates with a complementary screw thread defined by a wall of the housing or an intermediate piece connected to the housing to secure the annular member to the housing.

In a preferred embodiment the annular member is secured to the housing via a locking screw connection. The complementary screw threads may be defined by an outer circumferential surface of the axially extending flange of the annular member and a radially inward facing surface of the housing or the intermediate piece connected to the housing. An exemplary embodiment of this arrangement is shown in FIGS. 3A and 3B.

According to a fourth aspect of the present invention there is provided a turbine comprising:
  a turbine wheel mounted within a housing for rotation about a turbine axis; and
  an annular inlet passageway extending radially inwards towards the turbine wheel;
  the annular inlet passageway being defined between first and second opposing walls of the housing;
  wherein said first wall of the housing is defined by a radial wall of an annular member which is secured to a wall of the housing or an intermediate piece connected to the housing to secure the annular member to the housing.

The radial wall of the annular member secured to the housing may define one or more formations or "semi-shears" arranged to co-operate with appropriate formations defined by the section of the housing or the section of the intermediate piece to which the annular member is to be attached.

By way of a further example, securement of the annular member to the housing may be achieved or aided by one or more retaining members, e.g. retaining rings, which axially overlie one or more regions of the annular member and are then secured to the housing, or the intermediate piece, behind, i.e. axially outboard, of the annular member. An exemplary embodiment of this arrangement is shown in FIG. 4.

In a further embodiment, the annular member may be supported in a suitable annular cavity defined by the housing and the pressure of gas flowing through the inlet passageway exploited or employed to hold the annular member in place within the cavity, and thereby aid in securing it to the housing, during operation of the turbine.

In a yet further embodiment, the annular member may be retained against the turbine housing as a result of a force exerted on the annular member generated by a biasing member, such as a disc spring, which may, for example, be held captive between a wall of the cavity that receives the movable wall member and a component that contacts the annular member or a component connected to the annular member. A specific design according to this embodiment is shown in FIGS. 5A and 5B.

Any one or more of the above defined means for retaining the annular member to the turbine housing may be used singly or in combination with any one or more of the other means, including the screw connection described above in relation to the third aspect of the present invention.

A radially inner section of the annular member secured to the housing may have a surface with a profile that is selected based upon the shape of the turbine wheel so as to optimise the performance of the turbine wheel during some or all operating conditions. It is preferred that the surface of the radially inner section of the annular member has profile that corresponds to a radially outer profile of the turbine wheel. Matching the profile of the radially inner section of the annular member with the outer profile of the turbine wheel enables the clearance between the turbine wheel and the radially inner section of the annular member to be minimised. Minimising this clearance reduces losses in turbine efficiency which may occur due to gas leaking from the inlet passageway upstream of the turbine wheel to the outlet passageway of the turbine downstream of the turbine wheel without contributing to the rotation of the turbine wheel.

In a preferred embodiment, the second wall is a radially extending wall of a movable wall member mounted within a cavity provided within the housing. The movable wall member may be movable in an axial direction so as to vary the size of the annular inlet passageway and/or the movable wall member may be rotatably mounted within the cavity provided within the housing so as to be rotatable about the turbine axis, which permits rotational alignment of the rotatably mounted wall member with respect to the first wall.

An array of inlet guide vanes may be provided which extends across said annular inlet passageway to define a radial vane passage. The second wall may be part of a shroud which defines apertures for receipt of the vanes, the vanes being attached to a nozzle ring which corresponds to the annular member that is secured to the housing. Alternatively, the second wall may be part of a nozzle ring supporting the vanes for receipt in apertures defined by a shroud which corresponds to the annular member that is secured to the housing. Whichever component defines the second wall, e.g. a shroud defining vane slots or a nozzle ring supporting an array of vanes, it is preferred that the second wall is rotatably mounted within a cavity in the housing so that its angular position relative to the first wall can be adjusted to ensure the vanes can be correctly received by their respective slots and thereby avoid undesirable wear or jamming during operation of the turbine.

The turbine according to the third and/or fourth aspects of the present invention is preferably a variable geometry turbine.

According to a fifth aspect of the present invention, there is provided a turbocharger comprising a variable geometry turbine according to the first, second, third or fourth aspects of the invention.

Specific embodiments of the present invention will now be described, by way of example only, with reference to the accompanying drawings, in which.

Figure 1:
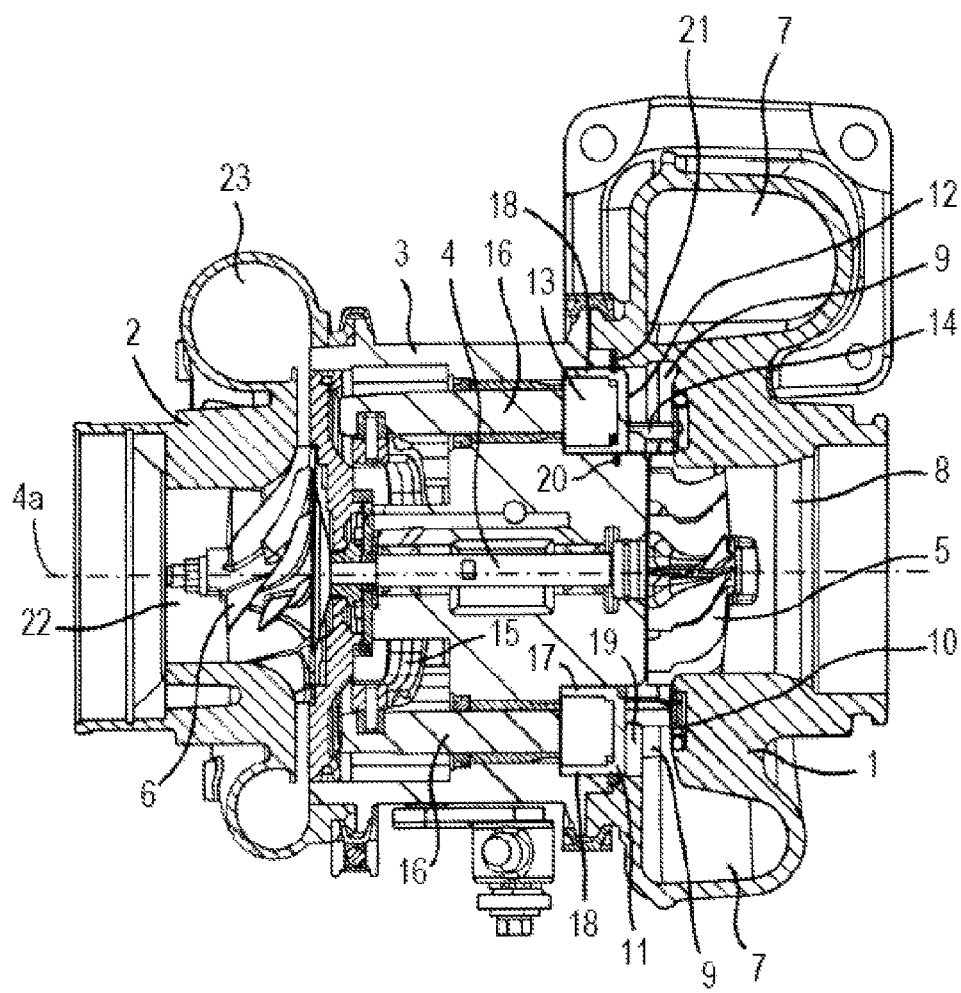
FIG. 1 shows a cross-sectional view of a turbocharger.

Referring to FIG. 1, this illustrates a known variable geometry turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4a on bearing assemblies located in the bearing housing 3.

The turbine housing 1 defines an inlet volute 7 to which gas from an internal combustion engine (not shown) is delivered. The exhaust gas flows from the inlet volute 7 to an axial outlet passageway 8 via an annular inlet passageway 9 and the turbine wheel 5. The inlet passageway 9 is defined on one side by a face of a radial wall of a movable annular wall member 11, comprising an annular shroud 12, and on the opposite side by a second wall member, also referred to as a nozzle ring 10, which forms the wall of the inlet passageway 9 facing the annular shroud 12. The shroud 12 defines an annular recess 13 in the annular wall member 11.

The nozzle ring 10 supports an array of circumferentially and equally spaced inlet vanes 14 each of which extends across the inlet passageway 9. The vanes 14 are orientated to deflect gas flowing through the inlet passageway 9 towards the direction of rotation of the turbine wheel 5. When the annular shroud 12 is proximate to the nozzle ring 10 the vanes 14 project through suitably configured slots in the shroud 12, into the recess 13.

The position of the annular wall member 11 is controlled by an actuator assembly of the type disclosed in U.S. Pat. No. 5,868,552. An actuator (not shown) is operable to adjust the position of the annular wall member 11 via an actuator output shaft (not shown), which is linked to a yoke 15. The yoke 15 in turn engages axially extending actuating rods 16 that support the annular wall member 11. Accordingly, by appropriate control of the actuator (which may for instance be pneumatic, hydraulic or electric), the axial position of the rods 16 and thus of the annular wall member 11 can be controlled. The speed of the turbine wheel 5 is dependent upon the velocity of the gas passing through the annular inlet passageway 9. For a fixed rate of mass of gas flowing into the inlet passageway 9, the gas velocity is a function of the width of the inlet passageway 9, the width being adjustable by controlling the axial position of the annular wall member 11. For a fixed rate of mass of gas flowing into the inlet passageway 9, up until the point at which the vanes 14 choke the passageway 9 the narrower the width of the inlet passageway 9, the greater the velocity of the gas passing through the inlet passageway 9. FIG. 1 shows the annular inlet passageway 9 fully open. The inlet passageway 9 may be closed to a minimum by moving the annular shroud 12 of the annular wall member 11 towards the nozzle ring 10. When the separation between the annular shroud 12 of the annular wall member 11 and the nozzle ring 10 is a minimum (such that the width of the inlet passageway is a minimum), the annular wall member 11 may be said to be in a closed position.

The annular wall member 11 has axially extending radially inner and outer annular flanges 17 and 18 that extend into an annular cavity 19 provided in the turbine housing 1. Inner and outer sealing rings 20 and 21 are provided to seal the annular wall member 11 with respect to inner and outer annular surfaces of the annular cavity 19 respectively, whilst allowing the annular wall member 11 to slide within the annular cavity 19. The inner sealing ring 20 is supported within an annular groove formed in the radially inner annular surface of the cavity 19 and bears against the inner annular flange 17 of the annular wall member 11. The outer sealing ring 20 is supported within an annular groove formed in the radially outer annular surface of the cavity 19 and bears against the outer annular flange 18 of the annular wall member 11.

Gas flowing from the inlet volute 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown).

Figure 2:
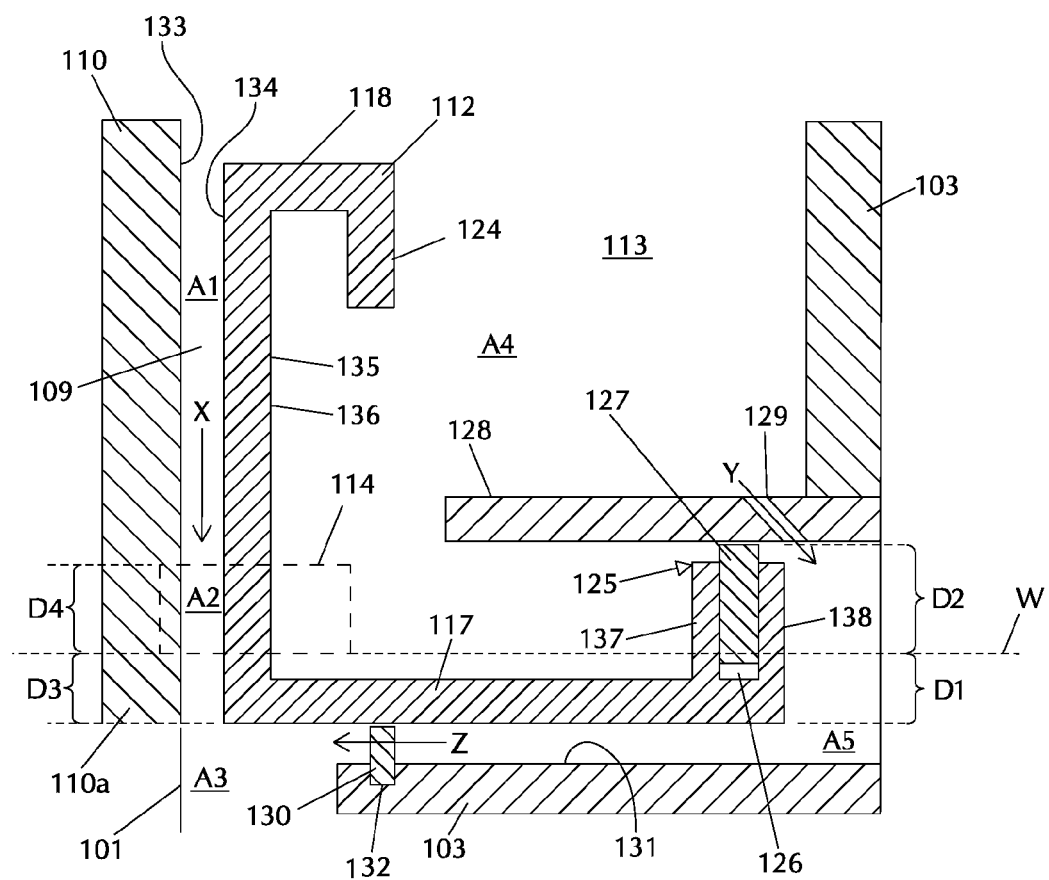
FIG. 2 shows a schematic cross-sectional view of a portion of a turbine according to the first and second aspects of the present invention.

FIG. 2 shows a schematic cross-sectional view of a portion of a turbine that is similar to that shown in FIG. 1 but which incorporates a pressure balancing arrangement according to the present invention. In this specific embodiment, the pressure balancing arrangement is associated with the annular shroud. Components of the turbine shown in FIG. 2 which correspond to those shown in FIG. 1 will take the same reference numbers in FIG. 2 but increased by 100.

Figure 3A:
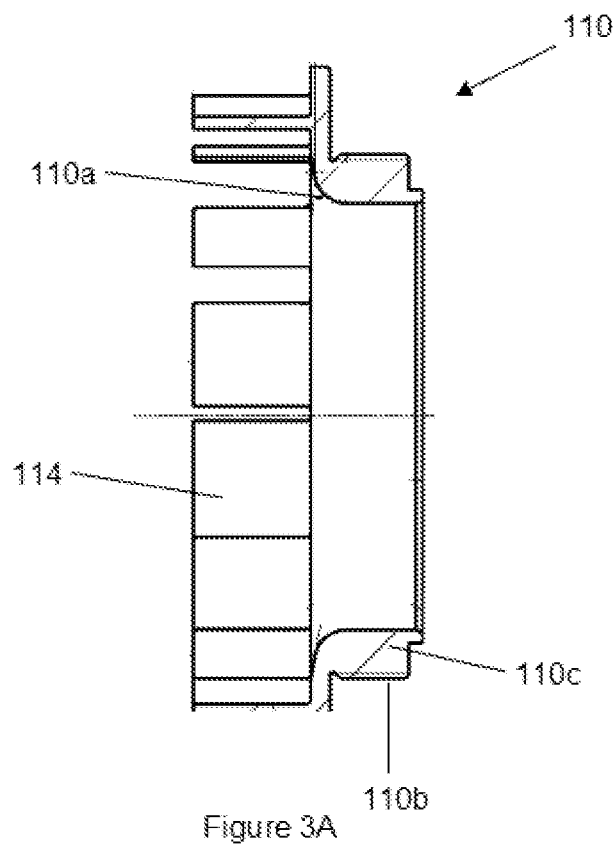
FIGS. 3A and 3B show a nozzle ring configured to be secured to a turbine housing using a locking screw connection according to the third aspect of the present invention (the nozzle ring alone is shown in FIG. 3A and the nozzle ring mounted in a turbine housing is shown in FIG. 3B)
Figure 3B:
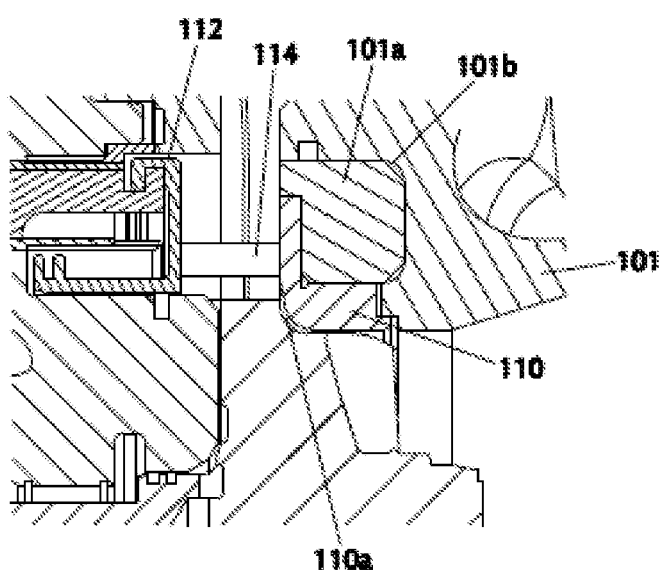

As in FIG. 1, in the arrangement shown in FIGS. 2, 3A and 3B a nozzle ring 110 is fixed to the turbine housing 101 via an intermediate ring 101a received in a cavity 101b defined by the housing 101. It will be appreciated that in alternative embodiments the intermediate ring 101a may be omitted and the required screw thread defined by a radially inward facing surface of the housing 101. The nozzle ring 110 supports an array of circumferentially spaced inlet vanes 114, each of which extends across the inlet passageway 109. In the present embodiment the nozzle ring 110 is fixed to the turbine housing 101 using a locking screw connection defined by an outer circumferential surface 110b of an axially extending flange 110c of the nozzle ring 110, however, any convenient means may be used as described in more detail below.

Referring again to FIG. 2, the vanes 114 are orientated to deflect gas flow in the direction of arrow X through the inlet passageway 109 towards the direction of rotation of the turbine wheel (not shown in FIG. 2). When the annular shroud 112 is proximate to the nozzle ring 110 the vanes 114 project through suitably configured slots (not shown) in the shroud 112.

In the embodiment shown in FIG. 2, the shroud 112 includes radially inner and outer axially extending annular flanges 117, 118 similar to those of the conventional shroud 12 shown in FIG. 1, however, the outer annular flange 118 of the embodiment shown in FIG. 2 is shorter than that of the outer annular flange 18 forming part of the conventional arrangement shown in FIG. 1. Additionally, an annular rim 124 extends radially inwards from the outboard end of the outer annular flange 118 so as to define a continuous annular channel extending around the full circumference of the shroud 112 for receipt of a circumferentially extending formation defined by the inboard end of a pair of actuator rods (not shown). In this way, the actuator rods remain free floating both radially and circumferentially during initial assembly and during use. This provides a way of connecting actuator rods to the shroud 112 which is significantly less complicated than most conventional arrangements. It also enables the actuator rods to be assembled with the shroud 112 at any desired angular position, and which can then be adjusted simply by rotating the shroud 112 and/or actuator rods with respect to one another. Moreover, this allows the shroud 112/actuator rod sub-assembly to be mounted within the bearing housing 103 whilst still permitting rotation of the shroud 112 to accommodate subsequent assembly of the nozzle ring 110 and its associated vanes 114, which must be accurately aligned with the slots defined by the shroud 112. Retaining the ability to rotate the shroud 112 with respect to the nozzle ring 110 during assembly significantly eases the process of accurately assembling and aligning these two components. Furthermore, connecting the actuator rods to the shroud 112 in this way so as to permit relative radial and circumferential displacement throughout use of the turbocharger provides a simple, yet innovative way of joining these two components together which can accommodate differential thermal expansion between the actuator rods and the shroud 112. It will be appreciated that the inwardly extending annular rim 124 should extend sufficiently far to define an annular channel of sufficient size to enable the end of the actuator rod(s) to be securely fixed thereto, but should not extend so far in a radial direction as to block the vane slots defined by the shroud 112 or to cause the actuator rod(s) to block the vane slots. Thus, the annular channel should be defined outside, i.e. radially outboard, of the outer diameter of the vane slots and, therefore, the vane passage defined by the array of vanes 114.

Specific embodiments of different shroud/actuator rod assemblies are described in more detail below. It will be appreciated that any embodiment of shroud/actuator rod assembly may be used with any embodiment of the different pressure balancing arrangements described and/or means of mounting the nozzle ring in the housing. Moreover, it should be appreciated that each embodiment of actuator rod assembly described herein as being connected to a shroud may also be used to control movement of a nozzle ring in arrangements where the nozzle ring is moveable relative to the housing, including, but not limited to, those arrangements where the shroud is fixed relative to the housing.

Figure 4:
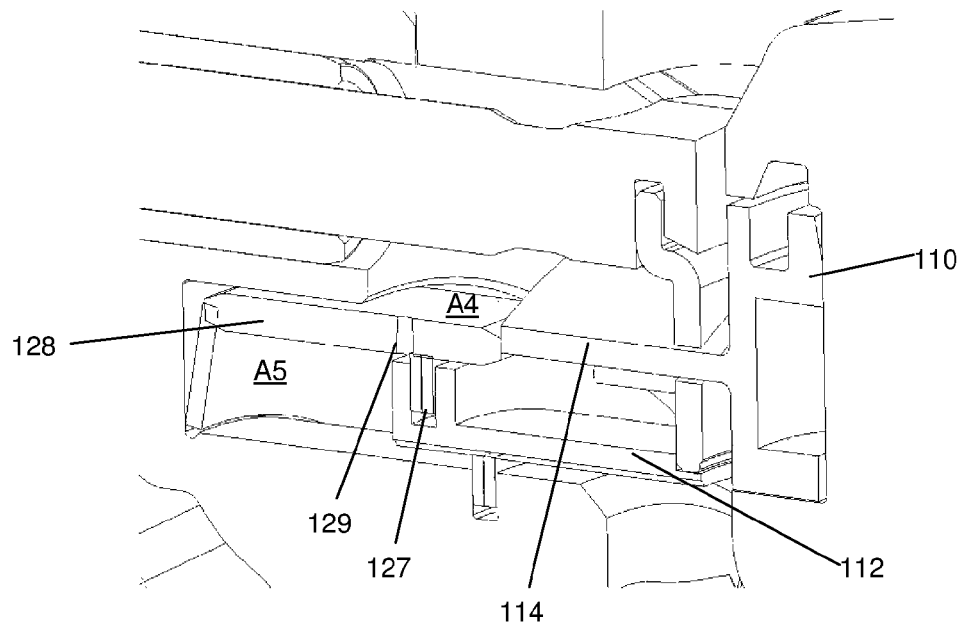
FIG. 4 shows a perspective sectioned schematic view of an exemplary embodiment of the turbine shown in FIG. 2 in which gas flow passages are defined by a sleeve.
Figure 5:
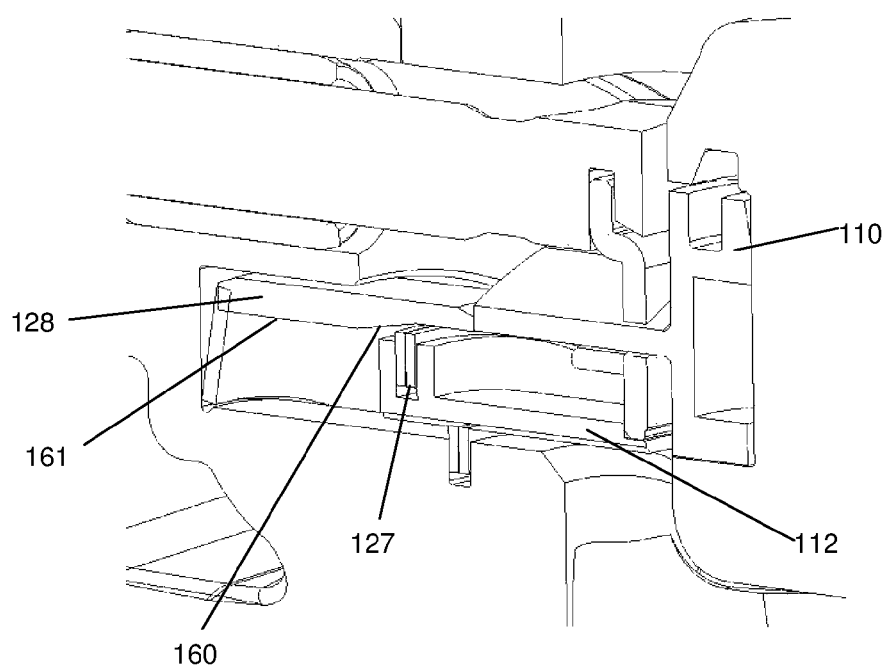
FIG. 5 shows a perspective sectioned schematic view of an alternative exemplary embodiment to that shown in FIG. 4, in which the gas flow passages are replaced with a larger diameter section of the sleeve.

Referring again to FIG. 2, at the outboard end of the inner annular flange 117 is a radially extending flange 125 which defines an annular groove 126 for receipt of an annular split seal ring 127. The seal ring 127 is dimensioned so as to contact the cylindrical sleeve 128 which extends axially from the bearing housing 103 into the annular recess 113 so as to provide a restriction to fluid flow in between the seal ring 127 and the cylindrical sleeve 128. The sleeve 128 defines a pair of small circular apertures 129 which extend through the radial thickness of the sleeve 128 in a direction that is inclined to the radius of the turbine shaft (not shown). Any number of apertures 129 may be used and the or each aperture may be of any desirable size and shape. Moreover, the apertures 129 may extend through the radial thickness of the sleeve 128 in any desirable direction, e.g. linearly, as shown in FIG. 2, or non-linearly, or radially. Additionally, the cross-section of each aperture may be constant along its length or may vary, e.g. tapering from large to small from the radially outer surface of the sleeve to the radially inner surface of the sleeve, or vice versa. The apertures 129 are defined so as to define a leakage path past the seal ring 127 under certain operating conditions, i.e. certain axial positions of the shroud 112, as explained in more detail below. Two different specific embodiments of this arrangement are shown in FIGS. 4 and 5, which take the same reference numbers for like parts as FIG. 2 for the sake of clarity. In FIG. 4, the sleeve 128 defines a series of apertures 129 through the radial thickness of the sleeve 128 so as to fluidly connect areas A4 and A5 when the shroud 112 is displaced towards the closed position, i.e. from left to right in FIG. 4. In FIG. 5, the apertures 129 in the sleeve 128 are replaced with a section 160 of the sleeve 128 of increased internal diameter. In this way, as the shroud 112 moves towards the closed position (again from left to right in FIG. 5) the seal ring 127 is moved from sealing against section 161 of the sleeve 128 to defining a radial clearance between the seal ring 127 and section 160 of the sleeve 128 and thereby fluidly connect areas A4 and A5.

Figure 6A:
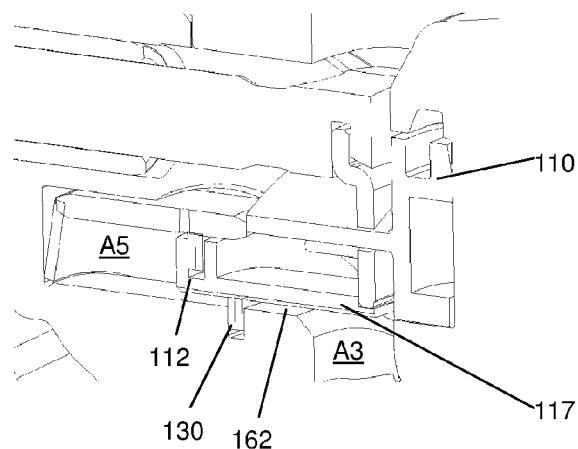
FIGS. 6A and 6B show a shroud defining gas leakage passages for use in a turbine according to the first and second aspects of the present invention (the shroud mounted in a turbine is shown in FIG. 6A and the shroud alone is shown in FIG. 6B)
Figure 6B:
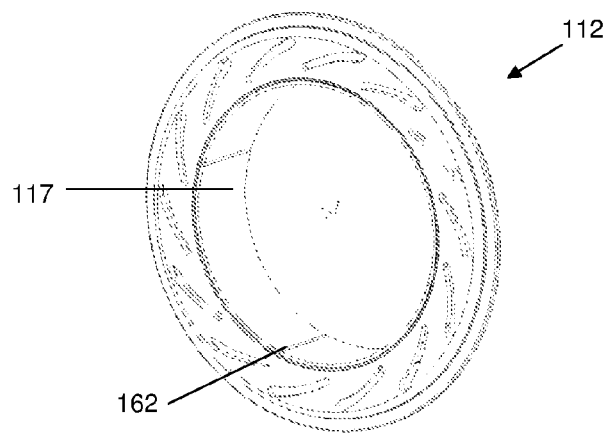
Figure 7:
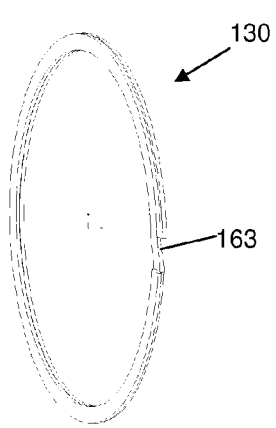
FIG. 7 shows a first embodiment of a seal ring for use in a turbine according to the first aspect of the present invention.
Figure 8:
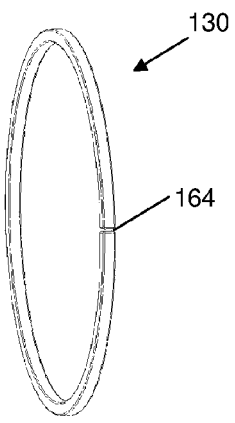
FIG. 8 shows a second embodiment of a seal ring for use in a turbine according to the first aspect of the present invention.
Figure 9:
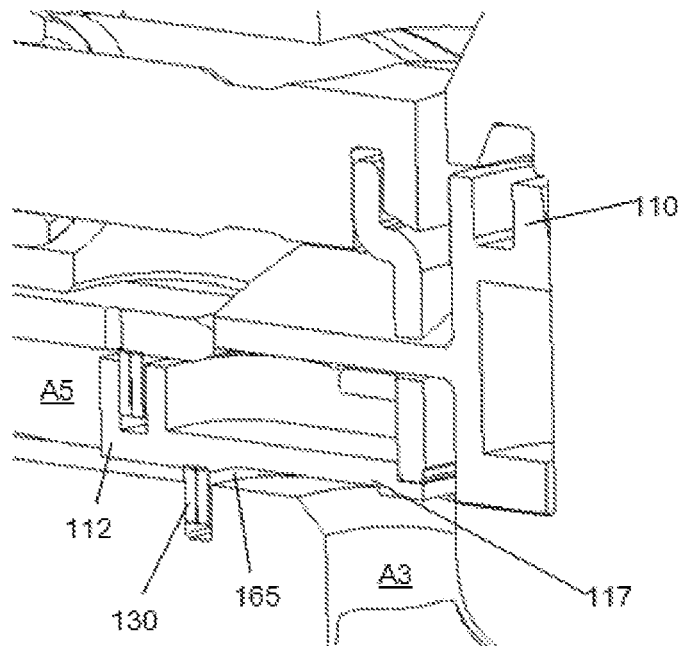
FIG. 9 shows a shroud with an enlarged diameter section to define gas leakage passages for use in a turbine according to the first and second aspects of the present invention.
Figure 10:
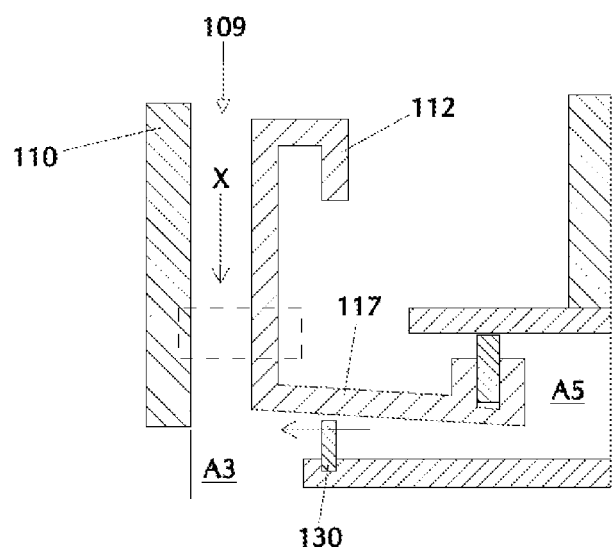
FIG. 10 shows a shroud with a tapered section to define gas leakage passages for use in a turbine according to the first and second aspects of the present invention.

Referring again to FIG. 2 further split seal ring 130 is provided between the inner annular flange 117 and an axially extending wall 131 of the bearing housing 103 that, in part, defines the annular recess 113 within which the shroud 112 is mounted. In the embodiment shown in FIG. 2 the wall 131 defines an annular groove 132 for receipt of the seal ring 130 such that the inner annular flange 117 of the shroud 112 runs over the radially outer edge of the seal ring 130 during axial displacement of the shroud 112. In an alternative arrangement, the inner annular flange 117 may define an annular groove for receipt of the seal ring 130 such that the radially inner edge of the seal ring 130 would run over the wall 131 of the bearing housing 103 during axial displacement of the shroud 112. This sealing arrangement is configured so as to define a leakage flow path across the seal ring 130, for reasons explained in more details below, which can be achieved in any convenient manner. For example, the radial extent of the seal ring 130 may be selected to define a predetermined radial clearance between the seal ring 130 and the inner annular flange 117. Alternatively, or additionally, the seal ring 130 may define grooves or cut-out sections of predetermined dimension. By way of a further example, the surface of the inner annular flange 117 may define one or more axially extending grooves which extend to both sides of the seal ring 130. The grooves may be skewed relative to the longitudinal axis of the turbine or may follow a helical or spiral path to maintain a uniform, reliable seal during axial displacement of the shroud 112. Specific exemplary embodiments are shown in FIGS. 6A to 10. In FIGS. 6A and 6B a plurality of axially extending grooves 162 are defined by the radially inner surface of the inner annular flange 117. It will be appreciated, however, that alternative embodiments may incorporate a single axially extending groove if appropriate. FIGS. 7 and 8 illustrate alternative embodiments of the seal ring 130 which have been modified from the conventional split seal ring version shown in FIG. 2 to incorporate circumferentially extending discontinuities 163 and 164 respectively of a desired form which, together with the inner annular flange 117, define radial clearances of a particular configuration to establish fluid flow paths of a specific nature to control the manner in which fluid flows from area A5 to A3. A further alternative embodiment is shown in FIG. 9 in which the inner annular flange 117 of the shroud 112 defines a region 165 of increased diameter as compared to the axially inboard and outboard ends of the inner annular flange 117 and in doing so defines a fluid leakage flow path past the seal ring 130. FIG. 10 shows a yet further option in which the inner diameter of the inner annular flange 117 increases linearly from its end adjacent to the bearing housing to its end adjacent to the turbine housing, which is closest to the inlet passageway 109. It will be appreciate that these represent just some of the ways in which a fluid leakage flow path can be established past the seal ring 130.

Figure 11:
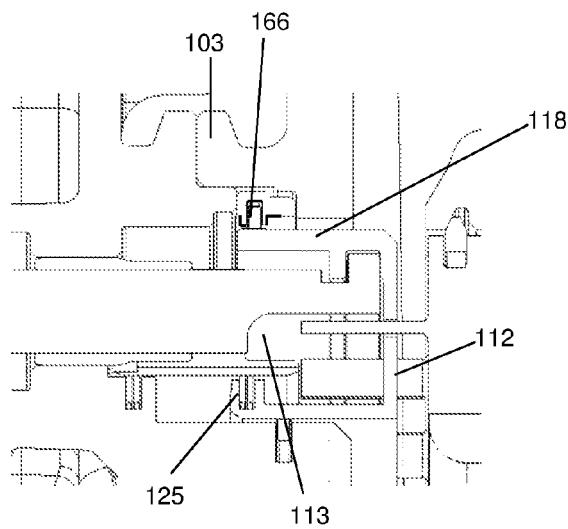
FIG. 11 shows a cross sectioned schematic view of a portion of a turbine according to the first and second aspects of the present invention which incorporates a shroud and shroud actuator rod assembly according to a preferred embodiment.
Figure 12A:
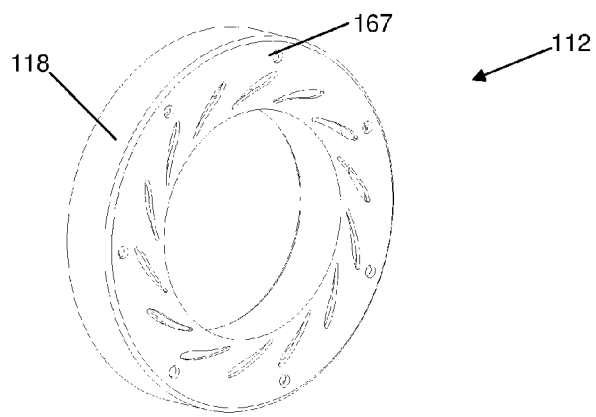
FIGS. 12A and 12B show perspective schematic views of the shroud depicted in FIG. 11.
Figure 12B:
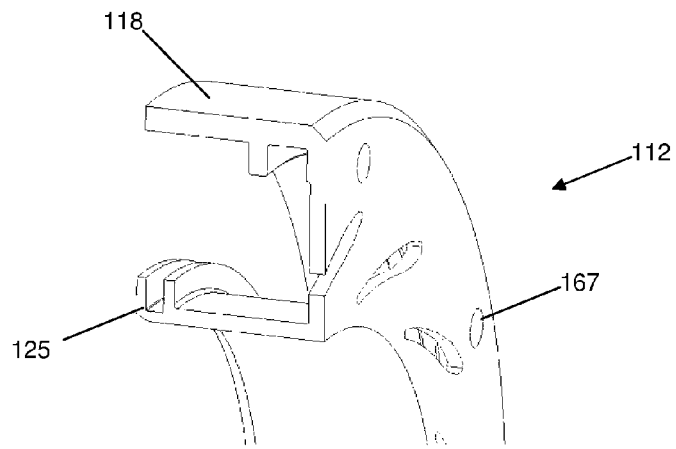

As can be seen in FIG. 2, the shroud 112 and the bearing housing 103 are arranged so as to define a path for gas flowing towards the turbine to flow into the annular recess 113 behind the shroud 112. In this way, such gas can flow around the relatively short outer annular flange 118 to transmit relatively high pre-turbine pressure to the back of the shroud 112. In an alternative arrangement, as shown in FIGS. 11, 12A and 12B, the shroud 112 may incorporate a relatively long outer annular flange 118 which can be sealed with respect to the bearing housing 103 by a seal ring 166 and a plurality of apertures 167 defined by the shroud 112 upstream of the outer diameter of the vane passage to facilitate the flow of gas at pre-turbine pressure to flow into the annular recess 113.

With reference to FIGS. 13A to 13D there is shown a preferred embodiment of a shroud similar to the shroud 112 described above in relation to FIG. 2. Components in the shroud of FIGS. 13A to 13D that are similar to those of the shroud 112 of FIG. 2 will take the same reference numerals but increased by 100.

Figure 13A:
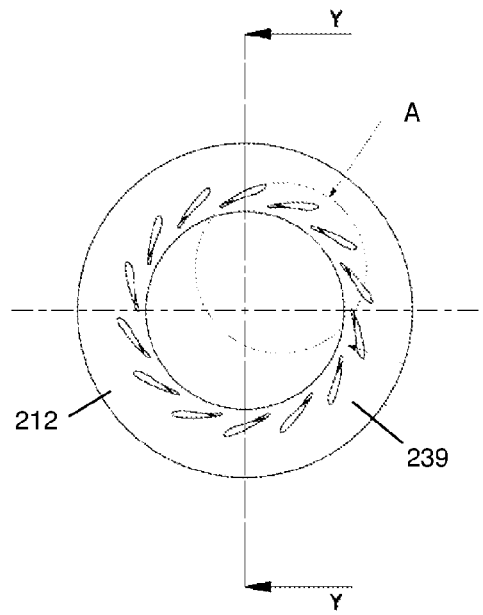
FIGS. 13A to 13D show schematic views of a shroud for use in a turbine according to preferred embodiments of the first and second aspects of the present invention.
Figure 13B:
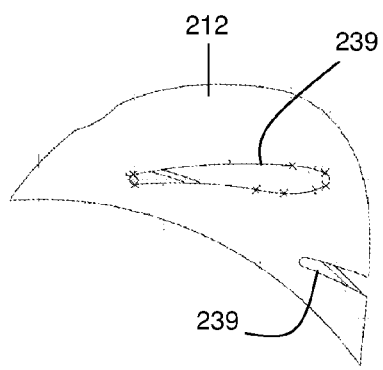

The shroud 212 as shown in FIG. 13A defines an annular array of vane slots 239 configured for sliding receipt of the vanes 114 described above with reference to FIG. 2. A more detailed view of the ringed section "A" of FIG. 13A is shown in FIG. 13B.

Figure 13C:
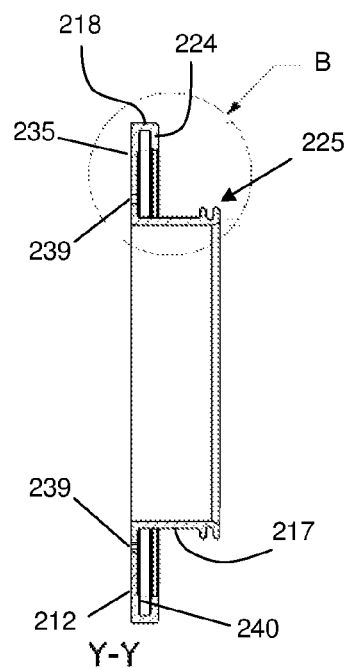
Figure 13D:
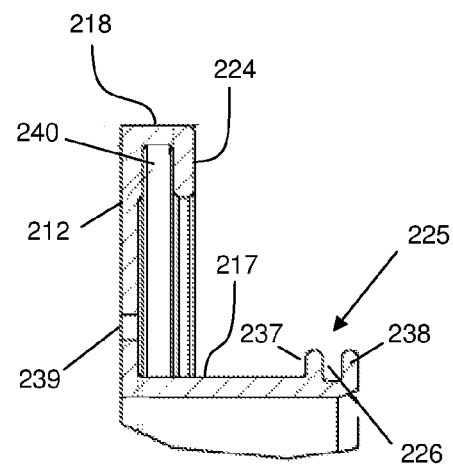

FIG. 13C is a schematic cross-sectional view of the shroud 212 with FIG. 13D showing a more detailed view of the ringed section "B" of FIG. 13C. As shown in FIG. 13C, the shroud 212 incorporates an axially extending, radially inner flange 217 and an axially shorter, radially outer flange 218. At the outboard end of the radially inner flange 217 is defined a radially extending flange 225 which forms part of the pressure balancing arrangement provided by the first aspect of the present invention. A radially inwardly extending rim 224 depends from the outboard end of the shorter, radially outer flange 218. The radially outer flange 218 and inwardly extending rim 224, together with the radial wall 235 of the shroud 212, define an annular channel 240 which extends around the full circumferential length of the annular shroud 212. This arrangement is shown in detail in FIG. 13D. Also shown in FIG. 13D is more detail of the pressure balancing flange 225 insofar as it incorporates a pair of radially outwardly extending flanges 237, 238 which cooperate to define an annular groove 226 for receipt of an annular seal ring (not shown). The configuration of the annular channel 240 has been designed to receive a circumferentially extending formation defined by the actuator rod shown in FIGS. 14A to 14D.

Figure 14A:
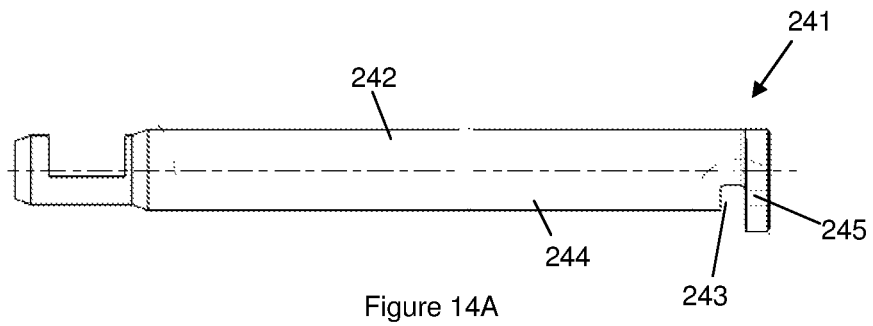
FIGS. 14A to 14D show schematic views of an actuator rod for use with the shroud shown in FIGS. 13A to 13D.
Figure 14B:
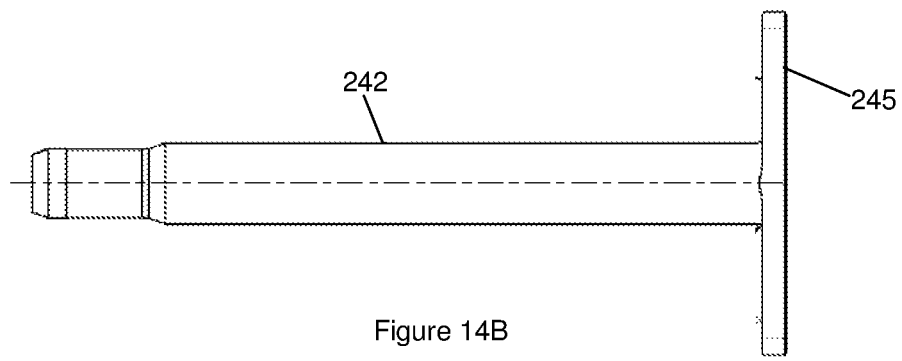
Figure 14C:
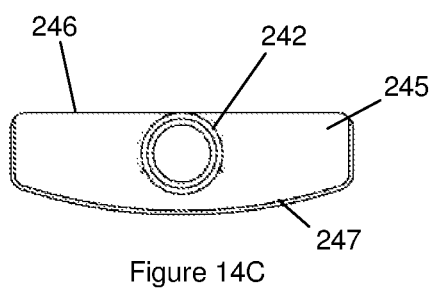
Figure 14D:
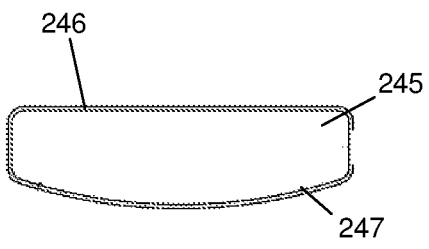

As shown in FIG. 14A, the inboard end 241 of the actuator 242 defines a clearance 243 in between a main body of the actuator 244 and a terminal formation or "foot" 245 of greater outer diameter than the outer diameter of the main body 244 of the actuator rod 242. The clearance 243 is dimensioned so as to accommodate receipt of the inwardly extending rim 224 of the shroud 212 so that the foot 245 of the actuator rod 242 can be received within the annular channel 240. As can be seen in FIGS. 14C and 14D, the foot 245 incorporates a radially inner edge 246, which is substantially flat, and an opposing radially outer edge 247, which defines an arc of radius which corresponds to that of the annular channel 240. In this way, when the foot 245 is accommodated in the annular channel 240 the actuator rod 242 can be slid in a circumferential direction along the circumferential length of the annular channel 240. Of course, it will be appreciated that this relative movement may be achieved by holding the rod 242 in place and rotating the annular shroud 212 relative to the fixed rod 242. In this way, the precise angular position of the or each rod 242 relative to the shroud 212 can be precisely controlled during initial assembly of the two components. As explained above, this is particularly important when assembling the shroud 212 with an opposing nozzle ring carrying vanes which must be accurately aligned with their respective vane slots 239 in the shroud 212.

It will be appreciated that the annular channel 240 does not have to extend around the full circumference of the annular shroud 212. The outer flange 218 and inwardly extending rim 224 may extend across less than 100% of the circumference of the shroud 212 so as to define one or more shorter arcuate annular channels extending over the angular position at which it is intended to mount the or each actuator rod 242. The length of each arcuate section may be the same or may differ from one angular position to another. Moreover, the arcuate length of the or each arcuate section may extend across any angular range, but preferably extends across a range which is at least the same as the angle between two adjacent vane slots 239.

Referring again to FIG. 13D, it can be seen that the inner diameter of the inwardly extending rim 224 of the shroud 212 lies radially outboard of the outer diameter of the vane slots 239. In this way, it can be ensured that when the foot 245 of the actuator rod 242 is engaged within the annular channel 240, the innermost diameter of any part of the actuator rod 242 lies radially outboard, i.e. at a greater diameter than the outer diameter of the vane slots 239, and therefore, the vane passage defined by the vanes 114 arranged to be received within the vane slots 239. Consequently, sliding receipt of the vanes 114 within the vane slots 239 is not hindered by the actuator rod(s) 242 when mounted to the shroud 212.

The pressure balancing flange 225, as described in detail below, enables smaller actuator rods 242 to be used than in many conventional moving shroud/nozzle ring turbines. It can be appreciated that this also has the benefit of allowing actuator rods of reduced radius to be used which further minimises the potential for any portion of the or each actuator rod 242 to overlie the vane slots 239.

Figure 15A:
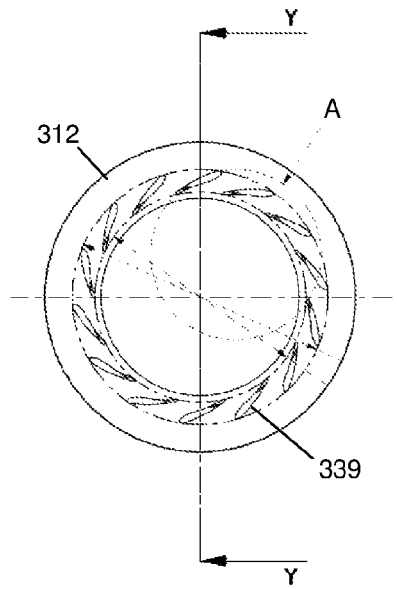
FIGS. 15A to 15D show schematic views of a further embodiment of a shroud for use in a turbine according to a further preferred embodiment of the first and second aspects of the present invention.
Figure 15B:
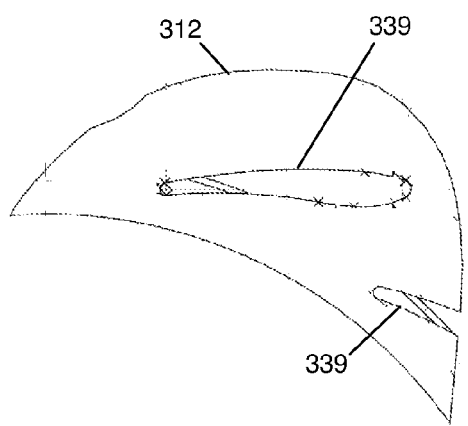

Turning to FIGS. 15A-15D, there is shown an alternative arrangement of a shroud 312 (again similar components will take the same reference number but increased by 100 as compared to FIG. 13). The shroud 312 again defines an annular array of vane slots 339 for sliding receipt of vanes 114 when mounted in a turbine as shown in FIG. 2. A more detailed view of the ringed section "A" of the shroud 312 shown in FIG. 15A is shown in FIG. 15B.

Figure 15C:
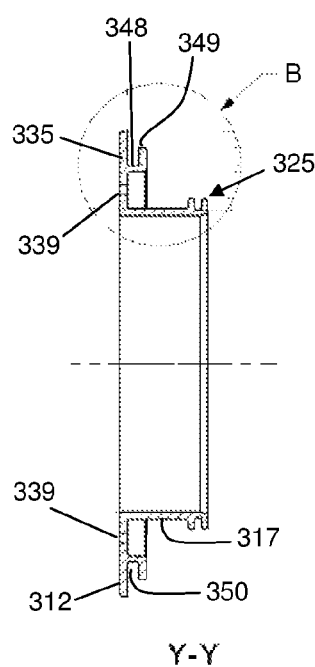
Figure 15D:
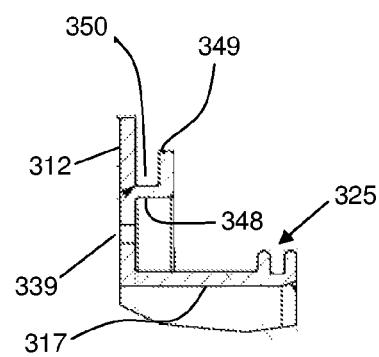

FIGS. 15C and 15D show schematic cross-sectional views of the shroud 312. The basic structure of the shroud 312 is similar to that of the shroud 212 shown in FIGS. 13A-13D except for the arrangement of the annular channel for receipt of the foot of an actuator rod. In the embodiment shown in FIGS. 15A-15D, the radially extending wall 335 of the shroud 312 extends to a particular outer diameter. Radially inboard of that outer diameter is defined an axially extending flange 348. To enable vanes 114 to be slidingly received in the vane slots 339, the axially extending flange 348 lies radially outboard of the outer diameter of the vane slots 339. At the outboard end of the axially extending flange 348 is defined a radially outwardly extending rim 349, which extends to a diameter that is less than the diameter of the outboard end of the radially extending wall 335 of the shroud 312. The rim 349, flange 348 and radially extending wall 335 cooperate to define an annular channel 350, which extends along the full circumferential length of the annular shroud 312. Again, as described above, the combination of flanges and rims may be selected so as to define one or more annular channels 350 which extend across an arc length less than the full circumference of the annular shroud 312. The annular channel 350 is configured for receipt of a complementary formation defined by an actuator rod 342 of the kind shown in FIG. 16A-16C.

Figure 16A:
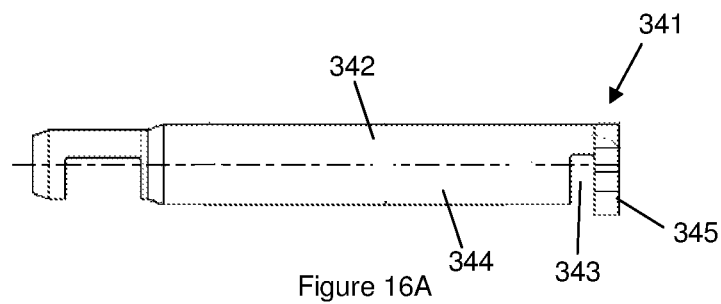
FIGS. 16A to 16C show schematic views of an actuator rod for use with the shroud of FIGS. 15A to 15D.
Figure 16B:
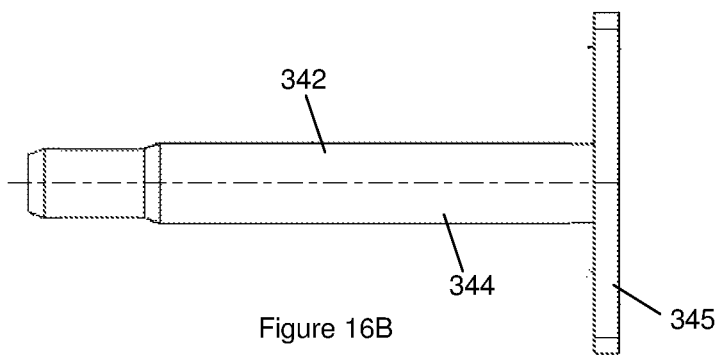
Figure 16C:
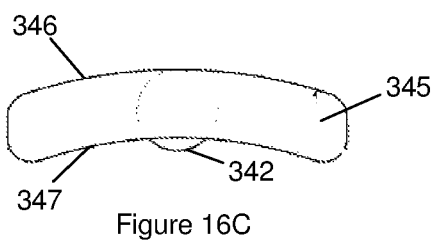

Referring to FIGS. 16A-16C, the actuator rod 342 comprises a main body section 344 which, in combination with an enlarged formation 345 at its inboard end 341, define a clearance 343. The clearance 343 is dimensioned to accommodate receipt of the radially extending rim 349 of the shroud 312. In this way, the formation or "foot" 345 of the actuator rod 342 can be engaged within the annular channel 350 of the shroud 312. In view of the arrangement of flanges and rims in the shroud 312 as being the reverse of that in the shroud 212 shown in FIG. 13, it is the radially inner edge 347 of the foot 345 which now runs across the surface of the axially extending flange 348 rather than the radially outboard edge 346 of the foot 345. Consequently, the radially inboard edge 347 of the foot 345 has an arcuate profile of radius that is substantially similar to that of the annular channel 350 defined by the axially extending flange 348. In the particular embodiment shown in FIG. 16C, the radially outboard edge 346 of the actuator rod 342 is also provided with an arcuate shape but it will be appreciated this does not have to be the case and that, for example, a flat edge could alternatively be used. Providing the radially inboard edge 347 and the actuator rod 342 with a curved profile that is similar, or the same, as that of the axially extending flange 348 enables the foot 345 of the actuator rod 342 to be slid along the annular channel 350 in a circumferential direction so that the or each actuator rod 342 can assume any angular position relative to the shroud 312. This can, of course, be achieved either by holding the or each actuator rod 342 in place and rotating the shroud 312 or vice versa. As explained above, enabling the one or more rods 342 to be mounted to the shroud 312 whilst still initially allowing relative rotation between the rod(s) 343 and shroud 312 enables the precise angular position of the or each rod 342 relative to the shroud 312 to be established easily, whilst also enabling accurate alignment of the vane slots 339 defined by the shroud 312 with the annular array of vanes 114.

Figure 17A:
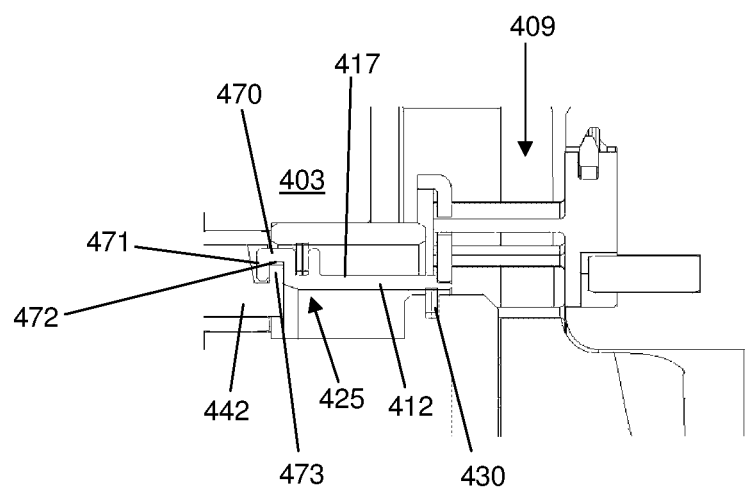
FIGS. 17A and 17B show cross sectioned and perspective schematic views respectively of a further design of shroud and actuator rod assembly mounted within a turbine according to the first and second aspects of the present invention.
Figure 17B:
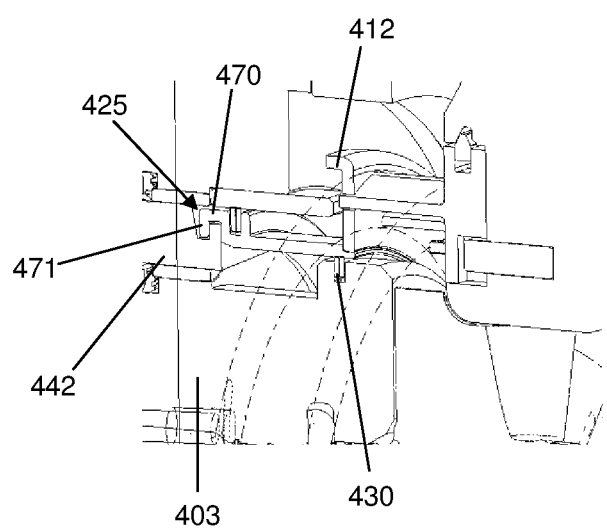

FIGS. 17A and 17B show a further alternative arrangement for connecting an actuator rod 442 to a shroud 412 (again similar components will take the same reference number but increased by 300 as compared to FIG. 2). As shown in FIGS. 17A and 17B, the inner annular flange 417 of the shroud 412 defines a rim 470 that extends axially towards the bearing housing 403 from the radially outer end of the pressure balance flange 425. A lip 471 extends radially inwards from the bearing housing end of the rim 470 so as to define an annular clearance 472 configured for receipt of a flange 473 that extends radially outwards from an end of the actuator rod 442 nearest to the inlet passageway 409. The reverse arrangement may also be used. That is, the rim 470 could extend axially from the radially inner end of the pressure balance flange 425 and the lip 471 could extend radially outwards so that the annular clearance 472 is configured for receipt of a radially inwardly extending version of the flange 473.

Figure 18:
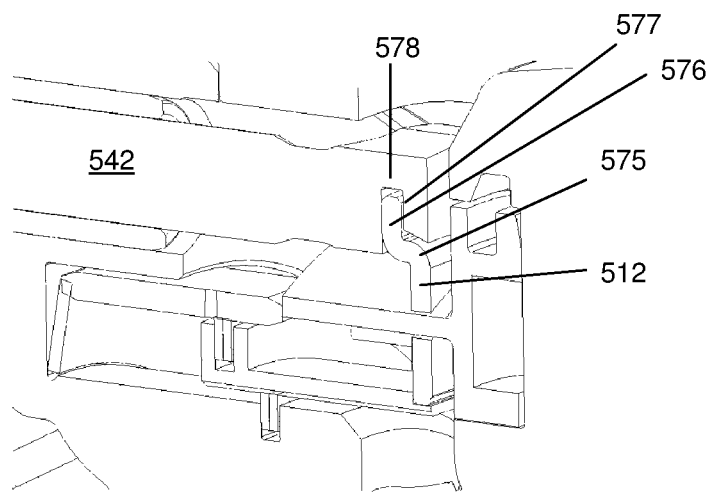
FIG. 18 shows a perspective schematic view of an alternative design of shroud and actuator rod assembly mounted within a turbine according to the first and second aspects of the present invention.

FIG. 18 shows another arrangement for connecting an actuator rod 542 to a shroud 512 (similar components again taking the same reference number but increased by 400 as compared to FIG. 2). In this arrangement the shroud 512 defines a relatively short axially extending radially outer flange in the form of a rim 575 around the radially outer periphery of the shroud 512 and which extends into a radially extending flange 576. The flange 576 has an axial thickness which is of a dimension so as to be receivable in a radially extending recess 577 defined by a terminal portion 578 of the actuator rod 542, the recess 577 defining an arcuate path in cross-section when viewed along the turbine axis.

Figure 19:
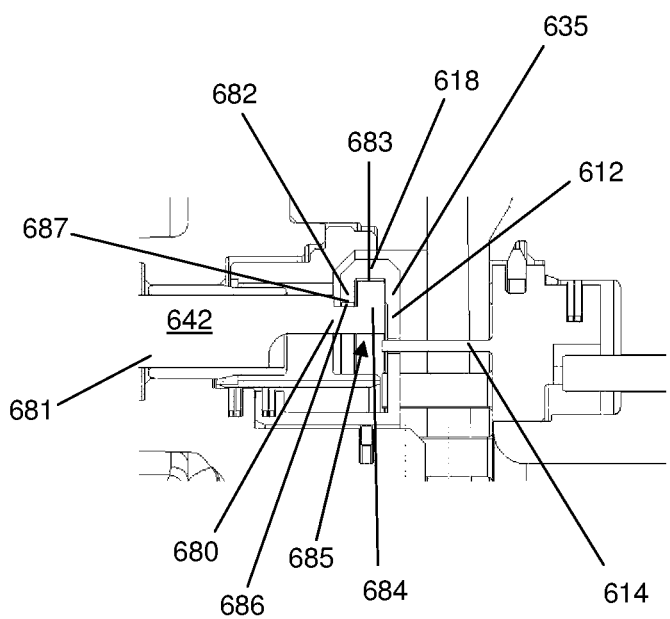
FIG. 19 shows a perspective schematic view of another design of shroud and actuator rod assembly mounted within a turbine according to the first and second aspects of the present invention.

In FIG. 19 there is shown a yet further arrangement for the connection of an actuator rod 642 to a shroud plate 612 (similar components taking the same reference number but increased by 500 as compared to FIG. 2). In the FIG. 19 arrangement the actuator rod 642 lies radially inboard of the outer axial flange 618 of the shroud 612. As a result, to ensure that there is sufficient space behind the shroud 612 for receipt of the vanes 614 through the vanes passages defined by the shroud 612, a portion 680 of the actuator rod 642 immediately behind the shroud 612 is of a greater diameter than a portion 681 of the actuator rod 642 further away from the shroud 612. The shroud 612 in this arrangement defines a relatively short radially outer flange 618. A flange 682 extends radially inwardly from the bearing housing end of the outer flange 618. The radial wall 635 of the shroud 612, outer flange 618 and inwardly extending flange 682 cooperate to define a circumferential groove 683 dimensioned for receipt of a radially outwardly extending finger 684 defined by a terminal portion 685 of the actuator rod 642. The terminal portion 685 of the actuator rod 642 further defines a circumferential recess 686 towards the bearing housing side of the finger 684 which is dimensioned for receipt of a tip 687 of the inwardly extending flange 682.

Figure 20:
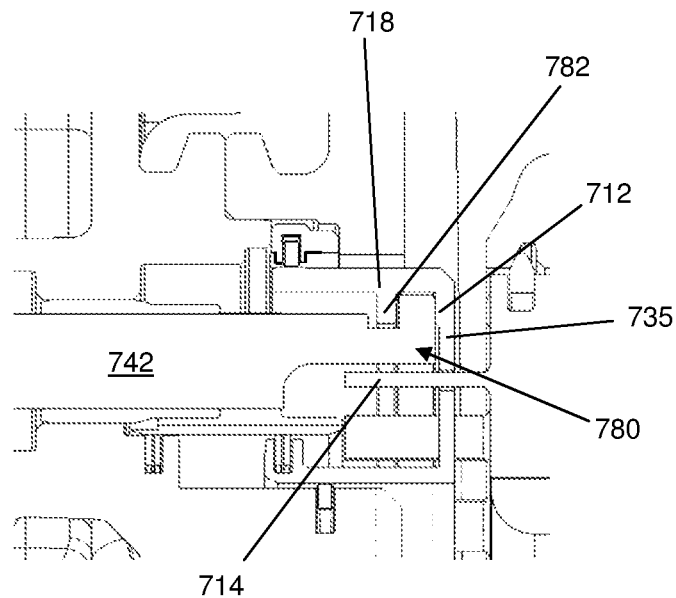
FIG. 20 shows a modified version of the shroud/actuator rod assembly of FIG. 19.

FIG. 20 defines a similar arrangement for connecting an actuator rod 742 to a shroud 712 to that shown in FIG. 19 save for the following differences (once again, similar components take the same reference number but increased by 600 as compared to FIG. 2). In the FIG. 20 arrangement, the shroud 712 defines an outer flange 718 which has a greater axial length than that of the outer flange 618 employed in the FIG. 19 arrangement. As a result, the inwardly extending flange 782 depends from an intermediate position along the axial length of the outer flange 718 rather than from the bearing housing end of the outer flange 618 as in the arrangement shown in FIG. 19. Since the actuator rod 742 in the FIG. 20 arrangement is again radially inboard of the outer flange 718 of the shroud 712, the actuator rod 742 again incorporates an increased diameter portion 780 to define a space behind the radial wall 735 of the shroud 712 to accommodate sliding receipt of the vanes 714 as they pass through the vane passages defined by the radial wall 735 of the shroud 712.

Figure 21:
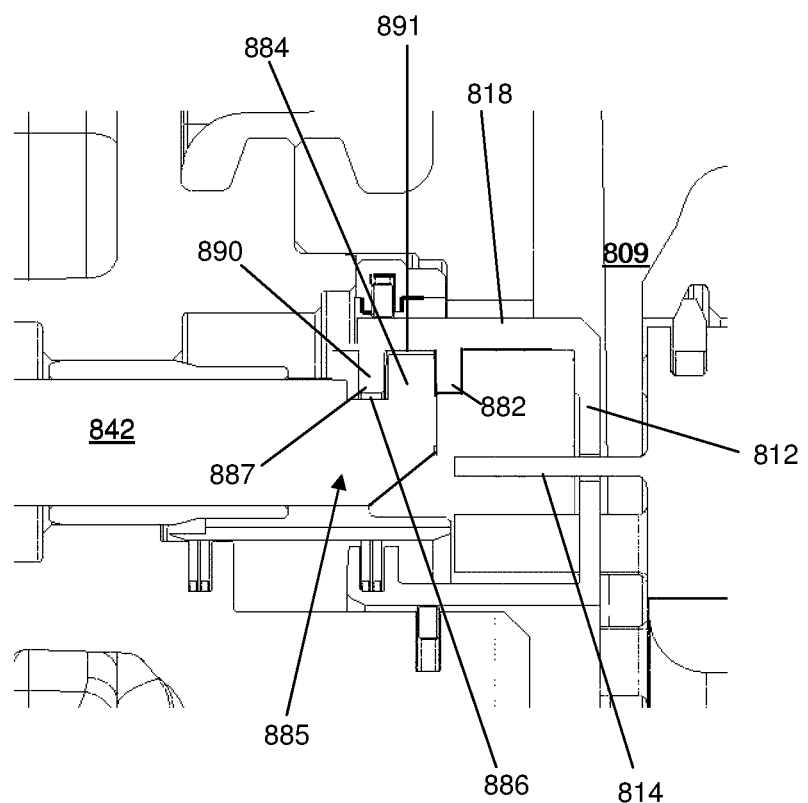
FIG. 21 shows an alternative modified version of the shroud/actuator rod assembly of FIG. 19.

The arrangement shown in FIG. 21 (similar components again taking the same reference number but increased by 700 as compared to FIG. 2) is similar in many respects to that shown in FIG. 20 except that in the FIG. 21 arrangement the flange 882 extends radially inwardly from a location on the outer flange 818 of the shroud 812 which is further into the bearing housing, i.e. further away from the turbine passageway 809, than in the arrangement shown in FIG. 20. Consequently, a second flange 890 extends radially inwardly to a similar radial extent to the flange 882 but extends from the bearing housing end of the outer flange 818. In this way, the two flanges 882, 890, in combination with the intervening section of the outer flange 818, cooperate to define a circumferential channel 891 for receipt of a radially outwardly extending finger 884 defined by a terminal portion 885 of the actuator rod 842. As in the arrangement shown in FIG. 19, the terminal portion 885 of the actuator rod 842 also defines a circumferential recess 886 towards the bearing housing side of the finger 884 which is dimensioned for receipt of a tip 887 of the inwardly extending flange 882.

Operation of the turbine shown in FIG. 2 incorporating the pressure balancing arrangement of the present invention will now be described.

It will be appreciated that if a surface is exposed to gas at a certain pressure then the pressure causes a force to be exerted on that surface perpendicular to the surface. The force exerted on a surface is equal to the product of the pressure of the gas contacting that surface and the area of the surface contacted by the gas. Some of the surfaces of the shroud 112 are generally radial whereas other surfaces are generally circumferential. Since the shroud 112 is mounted within the bearing housing such that it moves axially, any force which is exerted on one of the radial surfaces of the shroud will urge the shroud 112 either towards the nozzle ring 110, to thereby narrow the inlet passageway 109, or away from the nozzle ring 110, to thereby widen the inlet passageway 109. A force which is exerted on a circumferential surface of the shroud 112 will not urge the shroud 112 to move axially in either direction so can be ignored for the purposes of the following description of a preferred embodiment of the present invention.

In order to determine the net axial force which is exerted on the shroud 112 the individual forces acting on each of the radial surfaces must be summed. A surface which experiences a force which urges the shroud 112 away from the nozzle ring 110 will be described as "opposing" a surface which experiences a force which urges the shroud 112 towards the nozzle ring 110, and vice versa. In order to determine the net axial force on the shroud 112 due to forces exerted on two opposing radial surfaces, the force exerted on one of the opposing radial surfaces is subtracted from the force exerted on the other opposing radial surface.

Relatively high pressure exhaust gas flows from the engine exhaust manifold to the turbine in the direction of arrow X via the inlet passageway 109. Gas within the inlet passageway 109 initially flows through area A1 before impinging upon the vanes 114, which together define a vane passage in area A2. As the gas flows through area A2 its speed increases causing a reduction in its pressure such that the accelerated gas at area A3 has a lower pressure than the gas in areas A2 or A1. The arrangement of the shroud 112 and bearing housing 103 enables a quantity of the highest pressure gas entering the turbine from the engine to pass behind the shroud 112 into area A4 within the annular recess 113. The location of the seal rings 127, 130 between the shroud 112, the sleeve 128 and the wall 131 of the bearing housing 103 defines a further area A5 behind the radially extending flange 125.

With reference to FIG. 2, the inlet passageway 109 is defined between a radial surface 133 of the nozzle ring 110 (also referred to herein as the "front face" 133 of the nozzle ring 110) and an opposite radial surface 134 of a radial wall 135 of the shroud 118 (also referred to herein as the "front face" 134 of the shroud 112). As mentioned above, provision of the vanes 114 extending axially across the inlet passageway 109 establishes three different areas of differing pressure within the inlet passageway 109: A1; A2; and A3. Consequently, the opposing front faces 133, 134 of the nozzle ring 110 and shroud 112 respectively, are subjected to differing pressures within the three areas, A1, A2 and A3. The regions of the front faces 133, 134 in area A1 experience the highest pressure tending to push the shroud 112 back into the annular recess 113 and thereby open the inlet passageway 109. The regions of the front faces 133, 134 in area A2 experience a lower pressure, and the regions of the front faces in area A3 experience the lowest pressure.

A radial surface 136 of the radial wall 135 of the shroud 112 faces into the annular recess 113 (also referred to herein as the "back face" 136 of the shroud 112) and lies in area A4. Since the highest pressure gas upstream of the inlet passageway 109 can flow into area A4, the whole radial extent of the back face 136 of the shroud 112 experiences the same gas pressure as the front face 134 of the shroud 112 upstream of the vane passage, i.e. the region of the front face of the shroud 112 in area A1. Since the pressure of gas flowing through areas A2 and A3 of the inlet passageway 109 is lower than that within areas A1 and A4, the region of the back face 136 of the shroud 112 in the vane passage and downstream of the vane passageway experiences a higher gas pressure than the front face 134 of the shroud 112. As a result, in the absence of the pressure balancing arrangement of the present invention, which will now be explained, the forces acting on the radial wall 135 of the shroud 112 would tend to cause the shroud 112 to slam shut at small inlet passageway 109 widths when the pressure differential across the shroud 112 within the vane passage and downstream of the vane passage is greatest.

In order to compensate for this tendency for the shroud 112 to close down the inlet passageway 109, particularly when the spacing between the opposing front faces 133, 134 of the nozzle ring 110 and shroud 112 is small, there is provided the radially extending flange 125 (also referred to herein as the pressure balance flange 125). This flange 125 defines two opposing radially extending surfaces; a first radially extending "front face" 137 and a second radially extending "back face" 138. In the embodiment shown in FIG. 2, the front face 137 of the pressure balance flange 125 extends to a diameter which corresponds to the outer diameter of the vane passage. This does not necessarily have to be the case in all applications. The diameter to which the pressure balance flange 125 extends is selected on the basis of the level of pressure balancing required in view of the throat area of the vane passage employed in that particular application.

The annular groove 126 is defined around the outer circumferential edge of the pressure balance flange 125 so that the annular seal ring 127, when received in the annular groove 126 is positioned axially in between the front and back faces 137, 138 of the pressure balance flange 125. In doing so, the front face 137 of the pressure balance flange 125 resides in area A4 which contains the relatively high pressure gas during use, and the back face 138 of the pressure balance flange 125 resides in area A5 which, by virtue of being in fluid communication with area A3, contains gas at a relatively low pressure during use.

As discussed above, the seal ring 127 bears against the cylindrical sleeve 128. A leakage flow path past the seal ring 127 is provided by a pair of small apertures 129 in the sleeve 128 which become "active" to transmit high pressure gas from area A4 to area A5 in the direction of arrow Y when the shroud 112 is extended more than a predetermined distance (e.g. more than around half way) across the inlet passageway 109. The apertures 129 can be provided in the sleeve 128 to become active at any desired axial position of the shroud 112. Thus, in other applications it may be appropriate to locate the apertures 129 so that they only become active when the inlet passageway 109 has been closed down to small axial widths. In this way, areas A4 and A5 are sealed from one another while the turbine is operating with the inlet passageway relatively open, but are fluidly connected when the inlet passageway is closed down to relatively narrow widths. Once the two areas A4 and A5 are fluidly-connected, the pressure of gas in area A5 increases which thereby increases the force applied by the gas to the back face 138 of the pressure balance flange 125. As a result, the balancing force created by the pressure balance flange 125 tending to push the shroud 112 into the annular recess 113, i.e. to open the inlet passageway 109, reduces, thereby reducing the tendency for the shroud 112 to slam shut when the inlet passageway 109 is closed down to relatively small openings.

As mentioned above, the seal ring 130 and associated components are arranged to define a leakage flow path across the seal ring 130 to ensure fluid communication between the area behind the pressure balance flange 125, area A5, and the area of the inlet passageway 109 downstream of the vane passage, area A3. In the embodiment shown in FIG. 2, in which the wall 131 of the bearing housing 103 defines a circumferential groove 132 for receipt of the seal ring 130 the radial extent of the seal ring 130 has been selected to define a predetermined radial clearance between the seal ring 130 and the inner annular flange 117 of the shroud 112 which is "active", i.e. permits fluid flow, throughout all axial positions of the shroud 112. The cross-sectional areas of the leakage flow paths defined across the two seal rings 127, 130 should be controlled to ensure proper functioning of the pressure balancing arrangement. In the embodiment shown in FIG. 2, the cross-sectional area of the leakage flow path past the radially inner seal ring 130 between the bearing housing wall 131 and the shroud 112 is approximately 1 to 2 times the cross-sectional area of the leakage flow path past the radially outer seal ring 127 between the shroud 112 and the sleeve 128. It will be appreciated that the exact ratio of the two areas can be selected by the skilled person to suit a specific application once the various factors described above have been considered and the shroud actuator torque criteria determined.

Put another way, in order to minimize loading on the shroud 112 to provide the pressure balancing feature described above, the force tending to push the shroud 112 towards the bearing housing 103, i.e. to open the passageway 109, should be balanced, as far as possible, by the force tending to push the shroud 112 towards the nozzle ring 110, i.e. to close the passageway 109. Radially outboard of the vanes 114, the net force acting on the shroud 112 is zero because the pressure is the same on either side of the shroud 112 in this region. Radially inboard of the vanes 114, the force tending to move the shroud 112 towards the bearing housing 103 is balanced by the force on the region D1 of the back face 138 of the pressure balancing flange 125. The remaining factors are the opening force in the area A2 acting on the front face 134 of the shroud 112 in the vane passage, $F_{D4}$, and the closing force acting on the back face 138 of the pressure balancing flange 125 and the associated seal 127, $F_{D2}$. To achieve a zero net force on the shroud 112, these two forces should be the same in magnitude.

CFD analysis indicates that it is reasonable to assume that $P_{D4}=P_{D2}$. Consequently, the ideal scenario of zero net force can be defined by the respective surface areas, i.e. the surface area of D4 (minus the vane holes)=the surface area of D2.

In the case where the vanes are provided in an annular array, the area D4 of the front face 134 of the radial wall 135 of the shroud 112 is:

$$\tfrac{\pi}{4}(D_{vle}^2 D_{vte}^2) A_{vane\_holes} = \tfrac{\pi}{4}(D_{seal\_OD}^2 D_{vte}^2)$$

where: $D_{vle}$=diameter of vane leading edge
$D_{vte}$=diameter of the vane trailing edge
$D_{seal\_OD}$=diameter of seal radial outer edge
$A_{vane\_holes}$=total area of vane holes $$\frac{\pi}{4}D_{vle}^2 - A_{vane\_holes} - \frac{\pi}{4}D_{seal\_OD}^2$$

$A_{vane\_holes}$ is typically around $$0.07 * \frac{\pi}{4}D_{vle}^2$$

and so:

$$\frac{\pi}{4}D_{vle}^2 - 0.07\frac{\pi}{4}D_{vle}^2 = \frac{\pi}{4}D_{seal\_OD}^2$$

$$D_{vle}^2 - 0.07 D_{vle}^2 = D_{seal\_OD}^2$$

$$0.93 * D_{vle} = D_{seal\_OD}$$

The ratio of $D_{vane\_OD}/D_{turb\_wheel}$ typically ranges from around 1.3 to 1.75. Consequently, the ratio of $D_{seal\_OD}/D_{turb\_wheel}$ should range from 1.26 to 1.70.

Numerous modifications and variations may be made to the exemplary design described above without departing from the scope of the invention as defined in the claims.

In an alternative embodiment to that shown in FIG. 2, the radially inner section 110a of the nozzle ring 110 may have a surface with a profile that corresponds to the radially outer profile of the turbine wheel. Matching of the profile of the surface of the radially inner section 110a of the nozzle ring 110 with the outer profile of the turbine wheel enables the clearance between the turbine wheel and the nozzle ring 110 to be minimised. Minimising this clearance reduces losses in turbine efficiency which may occur due to gas leaking from the inlet passageway 109 upstream of the turbine wheel to the turbine outlet passageway (not shown) downstream of the turbine wheel without contributing to the rotation of the turbine wheel.

In a further alternative embodiment, the outer annular flange 118 of the shroud 112 may be reconfigured so as to define a clearance for receipt of the foot of an actuator rod extending around the outer circumference of the outer annular flange 118 rather than around the inner circumference as depicted in the FIG. 2. That is, the radially inwardly extending rim 124 could be replaced with a radially outwardly extending rim behind the radially extending wall 135 of the shroud 118 into which the foot of an actuator rod could be slotted by moving the rod radially inwards relative to the shroud 112 rather than radially outwards as is the case with the embodiment shown in FIG. 2. Both options provide a simple means of connecting actuator rods to the shroud 112 whilst also allowing the shroud 112 to be rotated during alignment of the shroud 112/actuator rod subassembly with the vanes extending from the nozzle ring 110.

Figure 22:
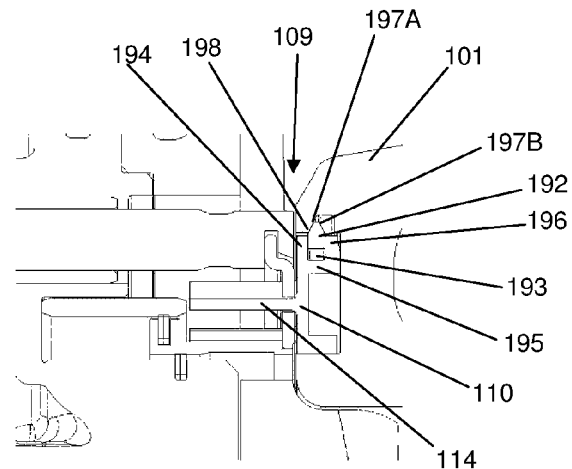
FIG. 22 shows a cross sectioned perspective schematic view of a retaining ring arrangement used to secure a nozzle ring to a turbine housing in a turbine according to the first and second aspects of the present invention.
Figure 23A:
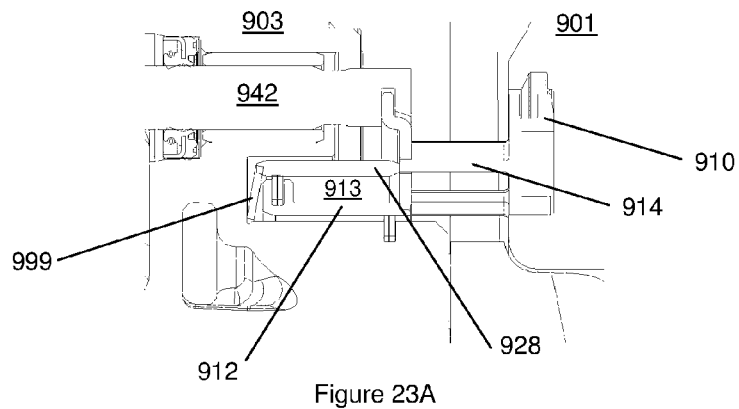
FIGS. 23A and 23B show cross sectioned and perspective schematic views of a disc spring arrangement to secure a nozzle ring to a turbine housing in a turbine according to the first and second aspects of the present invention.
Figure 23B:
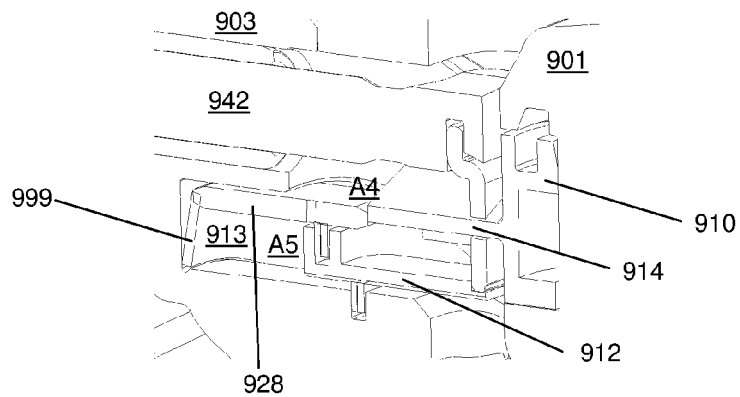

In the above described embodiment the nozzle ring 110 is fixed to the housing using a screw connection while the shroud 112 is actuated to move across the inlet passageway 109 to control the axial width of the inlet passageway 109. In an alternative embodiment, the shroud 112 may be fixed such that the nozzle ring 110 becomes the moving component. Moreover, both the shroud 112 and the nozzle 110 may be axially displaceable across the inlet passageway. In the embodiments where one of the shroud 112 and nozzle 110 is fixed, the radial wall of the fixed component, e.g. the nozzle ring 110, may define one or more formations or "semi-shears" arranged to co-operate with appropriate formations defined by the section of the housing to which the fixed component is to be attached. By way of a further example, the fixed component may be secured to the housing by one or more retaining members, e.g. retaining rings, which axially overlie one or more regions of the fixed component and are then fixed to the housing behind the fixed component. An exemplary embodiment of this arrangement is shown in FIG. 22, in which the nozzle ring 110, which carries the array of vanes 114, is fixed to the turbine housing 101 as a result of retaining ring 192. Retaining ring 192 is received in a circumferential groove 193 defined between a radial wall 194 of the nozzle ring, which in part defines the inlet passageway 109, an axially extending flange 195, which extends away from the inlet passageway 109, and a flange 196, which extends radially outwards from the turbine housing end of the axially extending flange 195. Radially outer edges 197A, 197B of the retaining ring 192 are inclined. The axially inboard outer edge 197A bears against a similarly inclined surface 198 of the turbine housing 101 so as to retain the nozzle ring 110 against the turbine housing 101. In a yet further alternative embodiment, the fixed component may be supported in a suitable annular cavity defined by the housing and the pressure of gas flowing through the inlet passageway 109 exploited to secure the fixed component in place within the cavity during operation of the turbine. A further alternative design is shown in FIGS. 23A and 23B (parts similar to those shown in FIG. 2 take the same reference numbers but increased by 800). In this embodiment, the nozzle ring 910, which carries the vanes 914, is retained against the turbine housing 901 as a result of a force exerted on the vanes 914 by the sleeve 928 mounted within the cavity 913 in the bearing housing 903. The force is generated by a disc spring 999 that is held captive between a wall of the cavity 913 and a back end of the sleeve 928 that is opposite to a front end of the sleeve 928 that abuts the vane 914. In this embodiment a disc spring is used however any appropriate biasing means may be used. The disc spring 999 serves not only to generate the force that maintains the sleeve 928 in contact with the vane 914, which in turn retains the nozzle ring 910 against the turbine housing 901, but it also acts as a seal to prevent higher pressure gas from area A4 flowing around the back end of the sleeve 928 into area A4.

Figure 24:
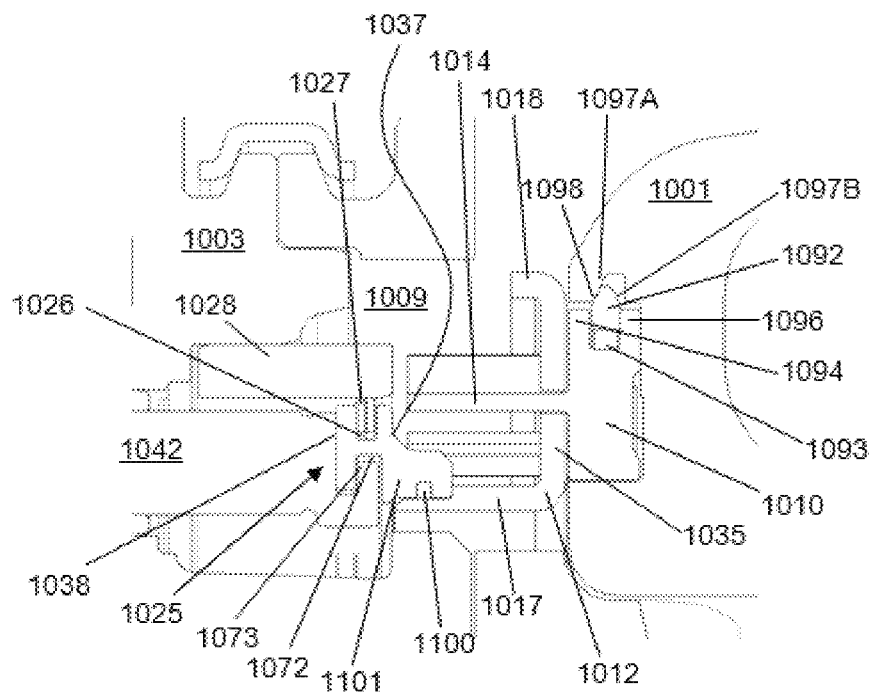
FIG. 24 is a cross sectioned schematic view of another design of shroud and actuator rod assembly mounted within a turbine according to the first and second aspects of the present invention.
Figure 25:
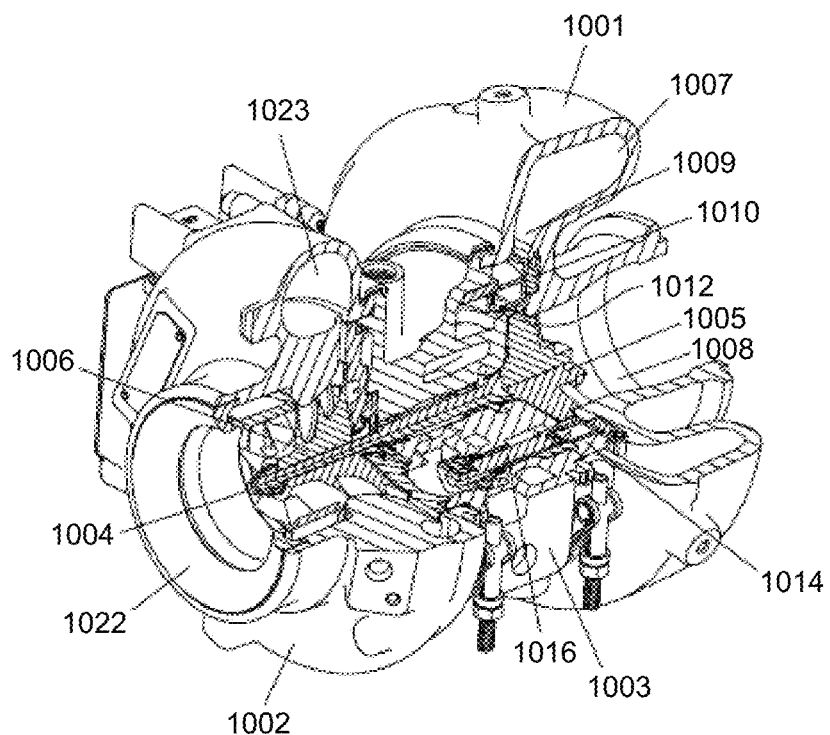
FIG. 25 is a part sectioned perspective schematic view of a turbocharger according to the fifth aspect of the present invention incorporating the shroud and actuator rod assembly shown in FIG. 24.

Referring now to FIGS. 24 and 25 there is shown another design of shroud 1012 and actuator rod 1042 assembly (similar components will take the same reference number but increased by 900 as compared to FIG. 2). This assembly is most similar to the embodiment shown in FIGS. 17A and 17B described above, but differs in that it does not incorporate a radially inner seal (denoted 430 in FIGS. 17A and 17B). The inner annular flange 1017 of the shroud 1012 is connected, via a braze provided in a groove 1100, to an annular member 1101 with a generally H-shaped radial cross section to define the pressure balance flange 1025. While a vacuum brazing of a braze paste has been employed in the embodiment shown in FIGS. 24 and 25, any suitable means of connection may be used. The H-cross section of the annular member 1101 provides a radially inboard annular clearance 1072 configured for receipt of a flange 1073 that extends radially outwards from an end of the actuator rod 1042 nearest to the inlet passageway 1009, and further defines a radially outboard annular clearance 1026 for receipt of a seal ring 1027 which seals against the cylindrical sleeve 1028. By virtue of the H-cross section of the annular member 1101, the two annular clearances 1072, 1026 are axially aligned, which is in contrast to the arrangement shown in other figures, for example, FIGS. 17A and 17B. This provides a more compact arrangement but one which still allows the required degree of axial displacement of the shroud 1012 to open and close the passageway 1009 to the desired extent.

The embodiment shown in FIGS. 24 and 25 incorporates a relatively short radially outer axially extending flange 1018 which, for example, is similar in axial length to the embodiment shown in FIGS. 17A and 17B, and much shorter than in the embodiment shown in FIGS. 20 and 21. The annular member 1101 is shown as a separate component connected to the radially inner axially extending flange 1017. In an alternative embodiment, the annular member 1101 may be formed integrally, as a single piece, with the radially inner axially extending flange 1017. In the embodiment shown in FIGS. 24 and 25, the nozzle ring 1010, which carries the array of vanes 1014, is fixed to the turbine housing 1001 as a result of retaining ring 1092, which is itself received in a circumferential groove 1093 defined between a radial wall 1094 of the nozzle ring 1010, which in part defines the inlet passageway 1009, and a flange 1096, which extends radially outwards from the turbine housing side of the nozzle ring 1010. Radially outer edges 1097A, 1097B of the retaining ring 1092 are inclined with the axially inboard outer edge 1097A bearing against a similarly inclined surface 1098 of the turbine housing 1001 so as to retain the nozzle ring 1010 against the turbine housing 1001. Gas flowing through the passageway 1009 over the vanes 1014 generates a torque on the nozzle ring 1010 which is restrained against rotation relative to the turbine housing 1001 by the provision of one or more axial projections (not shown) that extend axially from the nozzle ring 1010 into one or more complementary recesses (not shown) defined by the turbine housing 1001.

In the above-described embodiments the moving component, e.g. the shroud 112 in FIG. 2 or the shroud 1012 in FIG.

24, is located on the bearing housing side of the turbine while the fixed component, e.g. the nozzle ring 110 in FIG. 2 or the nozzle ring 1010 in FIG. 24, is located on the turbine housing side of the turbine. In an alternative embodiment, the moving component may be located on the turbine housing side of the turbine and the fixed component located on the bearing housing side of the turbine. Alternatively or additionally, actuation of the moving component may be achieved by an actuator located on the turbine housing side of the turbine rather than the bearing housing side as in the embodiments shown in, for example, FIGS. 2 and 24.

Furthermore, whilst the variable geometry turbine described forms part of a variable geometry turbocharger, it will be appreciated that this need not be the case. For example, the variable geometry turbine may be linked to a crankshaft and/or gear which transmits mechanical power to a flywheel or a power generating device.

While the invention has been illustrated and described in detail in the drawings and foregoing description, the same is to be considered as illustrative and not restrictive in character, it being understood that only the preferred embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A variable geometry turbine comprising:
    a turbine wheel mounted within a housing for rotation about a turbine axis; and
    an annular inlet passageway extending radially inwards towards the turbine wheel;
    the annular inlet passageway being defined between a first surface of a radially extending wall of a movable wall member mounted within a cavity provided within the housing and a facing wall of the housing;
    the movable wall member being movable in an axial direction so as to vary the size of the annular inlet passageway;
    an array of inlet guide vanes extending across said annular inlet passageway to define a radial vane passage;
    the radially extending wall of the movable wall member defining a radial second surface that opposes the first surface;
    the moveable wall member further comprising an annular flange that extends axially into the cavity and which supports a radially extending flange that defines opposing radial third and fourth surfaces;
    the radially extending flange sealing against an annular sleeve provided in the cavity so as to define a first area within the cavity which includes the radial second and third surfaces and a second area within the cavity which includes the radial fourth surface;
    the first area within the cavity being in fluid communication with a region of the annular inlet passageway upstream of the radial vane passage; and
    the second area within the cavity being in fluid communication with a region of the annular inlet passageway downstream of the radial vane passage,
    wherein said fluid communication between the second area within the cavity and the region of the annular inlet passageway downstream of the radial vane passage is facilitated by a gas flow path defined between the annular flange and a wall of the cavity by a sealing arrangement between the annular flange and the wall of the cavity.

2. A variable geometry turbine according to claim 1, wherein an extent to which the radially extending flange extends radially from a radially inner surface of the annular flange is not greater than a distance from the radially inner surface of the annular flange to an outer diameter of the vanes extending across the inlet passageway.

3. A variable geometry turbine according to claim 1, wherein at least one of the moveable wall member and the housing is arranged to define a gas flow path into the cavity behind the moveable wall member.

4. A variable geometry turbine according to claim 1, wherein a radially outer edge of the moveable wall member is sealed with respect to the housing and at least one aperture is defined by the moveable wall member upstream of the vane passage to define a gas flow path into the cavity.

5. A variable geometry turbine according to claim 1, wherein the annular sleeve defines a leakage path to permit gas, during use, at the relatively high pre-turbine pressure within the first area to flow into the second area to increase the pressure of gas within the second area.

6. A variable geometry turbine according to claim 5, wherein the leakage path is defined by at least one aperture provided at a location on the annular sleeve such that, during use, it is open to permit gas flow therethrough when the moveable wall member is positioned so that the axial width of the inlet passageway between the moveable wall member and the facing wall of the housing is less than 20% of its width when the moveable wall member is fully retracted into the cavity.

7. A variable geometry turbine according to claim 5, wherein said fluid communication between the second area within the cavity and the region of the annular inlet passageway downstream of the radial vane passage is facilitated by a gas flow path defined between the annular flange and a wall of the cavity and the total cross-sectional area of the leakage path defined by the annular sleeve is similar to or less than the total cross-sectional area of the gas flow path defined by the sealing arrangement between the annular flange and the wall of the cavity.

8. A variable geometry turbine according to claim 1, wherein the sealing arrangement is located radially inwardly of the position at which the radially extending flange seals against the annular sleeve.

9. A variable geometry turbine according to claim 8, wherein the sealing arrangement defines a predetermined radial clearance to provide said gas flow path between the annular flange and the wall of the cavity.

10. A variable geometry turbine according to claim 8, wherein the sealing arrangement defines at least one groove or cut-out section of predetermined dimension in its outer surface facing the wall of the cavity to provide said gas flow path between the annular flange and the wall of the cavity.

11. A variable geometry turbine according to claim 8, wherein a radially inner surface of the annular flange defines at least one axially extending groove which extends to both sides of the sealing arrangement to provide said gas flow path between the annular flange and the wall of the cavity.

12. A variable geometry turbine according to claim 1, wherein the moveable wall member is a shroud defining apertures for receipt of the vanes which are attached to a nozzle ring whose radial surface corresponds to the facing wall of the housing.

13. A variable geometry turbine according to claim 1, wherein the moveable wall member is a nozzle ring which supports the vanes for receipt in apertures defined by a shroud plate whose radial surface corresponds to the facing wall of the housing.

14. A variable geometry turbine according to claim 1, wherein the facing wall is secured to the housing.

15. A variable geometry turbine according to claim 12, wherein the facing wall is secured to the housing via a locking screw connection.

16. A variable geometry turbine according to claim 13, wherein complementary locking screw threads are defined by an outer circumferential surface of an axially extending flange connected to the facing wall and a radially inward facing surface of the housing or a ring secured to the housing.

17. A turbocharger comprising a variable geometry turbine according to claim 1.

18. An engine comprising a variable geometry turbine according to claim 1.

19. A variable geometry turbine comprising:
a turbine wheel mounted within a housing for rotation about a turbine axis; and
an annular inlet passageway extending radially inwards towards the turbine wheel;
the annular inlet passageway being defined between a first surface of a radially extending wall of a movable wall member mounted within a cavity provided within the housing and a facing wall of the housing;
the movable wall member being movable in an axial direction so as to vary the size of the annular inlet passageway;
an array of inlet guide vanes extending across said annular inlet passageway to define a radial vane passage;
the radially extending wall of the movable wall member defining a radial second surface that opposes the first surface;
the moveable wall member further comprising an annular flange that extends axially into the cavity and which supports a radially extending flange that defines opposing radial third and fourth surfaces;
the radially extending flange sealing against an annular sleeve provided in the cavity so as to define a first area and a second area;
the first area within the cavity being in fluid communication with a region of the annular inlet passageway upstream of the radial vane passage; and
the second area within the cavity being in fluid communication with a region of the annular inlet passageway downstream of the radial vane passage,
wherein said fluid communication between the second area within the cavity and the region of the annular inlet passageway downstream of the radial vane passage is facilitated by a gas flow path defined between the annular flange and a wall of the cavity by a sealing arrangement between the annular flange and the wall of the cavity.

* * * * *